United States Patent [19]

Saitoh et al.

[11] Patent Number: 4,968,997
[45] Date of Patent: Nov. 6, 1990

[54] RECORDING SHEET CONVEYOR APPARATUS IN AN IMAGE RECORDING APPARATUS

[75] Inventors: Masanori Saitoh, Tokyo; Nobuaki Kubo, Saitama, both of Japan

[73] Assignee: Ricoh Company, Ltd., Tokyo, Japan

[21] Appl. No.: 433,610

[22] Filed: Nov. 8, 1989

[30] Foreign Application Priority Data

| Nov. 11, 1988 | [JP] | Japan | 63-285282 |
| Dec. 28, 1988 | [JP] | Japan | 63-331556 |
| Apr. 21, 1989 | [JP] | Japan | 1-103228 |
| Apr. 21, 1989 | [JP] | Japan | 1-103229 |
| Apr. 25, 1989 | [JP] | Japan | 1-105375 |
| Apr. 28, 1989 | [JP] | Japan | 1-111831 |
| Apr. 28, 1989 | [JP] | Japan | 1-111832 |

[51] Int. Cl.$^5$ .......................................... B41J 2/435
[52] U.S. Cl. .................................. 346/136; 346/108; 346/24
[58] Field of Search ............... 346/136, 108, 22, 24, 346/76 PH; 271/273; 355/309

[56] References Cited

U.S. PATENT DOCUMENTS

| 4,681,313 | 7/1987 | Yokoyama et al. | 271/273 |
| 4,814,793 | 3/1989 | Hamada et al. | 346/108 |
| 4,878,067 | 10/1989 | Yagoto et al. | 346/108 |

FOREIGN PATENT DOCUMENTS 100867 5/1988 Japan.

Primary Examiner—Joseph W. Hartary
Assistant Examiner—Alrick Bobb
Attorney, Agent, or Firm—Cooper & Dunham

[57] ABSTRACT

A recording sheet conveyor apparatus is incorporated in an image recording apparatus having a recording sheet housing to house recording sheets, an information recording device to record image information on the moving recording sheet that has been drawn out of the recording sheet housing, and a sheet receiving device to receive the discharged recording sheet after image information has been recorded to them. The conveyor apparatus includes a conveyor path between the recording sheet housing and the sheet receiving device, a main roller for feeding a recording sheet at a predetermined speed, a feed roller for feeding the recording sheet in the direction of the main roller, a discharge roller for feeding a recording sheet to the sheet receiving device after recording has been performed for it, and a roller drive prohibit device to prohibit at least one of the feed rollers and the discharge roller in the range of the recording sheet fed by the main roller from being driven while the information recording device is performing recording.

22 Claims, 27 Drawing Sheets

RECORDING SHEET CONVEYOR APPARATUS IN AN IMAGE RECORDING APPARATUS

BACKGROUND OF THE INVENTION

The present invention relates to a recording sheet conveyor apparatus in a recording apparatus such as a laser beam recorder or the like, and more specifically relates to a recording sheet conveyor apparatus having a recording sheet housing means to house the recording sheets that are the recording medium, an information recording means to draw the recording sheets from the recording sheet housing means and to record image information upon the sheets when they are moving, and a sheet receiving means to receive discharged sheets upon which image information has been recorded, and which is applicable to image recording apparatus.

FIG. 1A and FIG. 1B indicate conventional recording sheet conveyor apparatus. The conventional apparatus shown in FIG. 1A comprises a conveyor path 15 between a cassette 2 housing a recording sheet 1 and a sheet receiving device 16. Along the conveyor path 15 is provided a main roller 3 to send the recording sheets 1 at a predetermined speed to a recording position in a recording unit 11. Three feed rollers 4, 5 and 6 are provided along the conveyor path 15 between the cassette 2 and the main roller 3 to feed the recording sheets 1 to the main roller 3. In addition, along the conveyor path 15 and between the main roller 3 and the sheet receiving device 16 is provided a discharge roller 12 to feed recording sheets 1 upon which recording has been performed, to the sheet receiving device 16. Each of the feed rollers 4, 5 and 6 have a drive roller 7 which is linked to a motor, and a nip roller 8 which rotates in accordance with the rotation of a drive roller 7 and together with the drive roller 7 holds the recording sheet 1. The main roller 3 comprises a main drive roller 9 and a pair of nip rollers 10a, 10b. The main drive roller 9 is linked to the main motor, and the nip rollers 10a, 10b are positioned before and after the main drive roller 9. The recording sheet 1 is held between the main roller 9 and the nip rollers 10a, 10b. The nip rollers 10a, 10b rotate along with the rotation of the main drive roller 9. In the same way as the feed roller, the discharge roller 12 also has a nip roller 14 and a drive roller 13 linked to a motor.

In an information recording apparatus having this configuration, in order to obtain a high image quality, it is necessary to convey the recording sheet 1 at a constant speed when recording by the main roller is being performed, so that unwanted external forces are not applied to the recording sheet 1.

One example of an image recording apparatus in which the recording sheets 1 are conveyed at a constant-speed so that unwanted external forces do not apply is disclosed in Japanese Patent Laid-Open Publication No. 100867-1988.

According to this invention, a recording sheet positioned immediately before the main roller 3 is made to assume a loop shape and the main roller 3 feeds the recording sheet 1 in a state where external forces are not applied. Also, the discharge roller 12 which is the roller closest to the main roller 3, is driven by the same drive as the main roller 3 when recording is being performed.

In such a conventional recording sheet conveyor apparatus, the main roller 3, the feed rollers 4, 5 and 6, and the discharge roller 12 are all driven when recording is performed. Because of this, the vibration that is created by the drive sources for each of the rollers is transmitted to the recording sheet 1.

In addition, variations in the speed of rotation of the discharge roller 12 cause fluctuations in the load acting upon the recording sheet 1 and these load variations also cause the recording sheet 1 to vibrate. This vibration of the recording sheet 1 during recording causes the quality of the recorded image to drop.

The conventional recording sheet conveyor apparatus indicated in FIG. 1B, simply introduces a recording sheet 1 drawn out from the cassette 2, into the conveyor path 15. The first feed roller 4 has a mechanism to bring a nip roller 8 into contact with a drive roller 7 and to separate the nip roller 8 from the drive roller 7. The recording sheet 1 is inserted between the nip roller 8 and the drive roller 7 in the status when the nip roller 8 is separated from the drive roller 7. Then, the nip roller 8 is pressed against the drive roller 7 and the recording sheet 1 is held between the drive roller 7 and the nip roller 8. When the recording sheet 1 is in this status and the feed rollers 4, 5 and 6 are driven, the recording sheet 1 is sequentially fed toward the main roller 3.

In such a conventional recording sheet conveyor apparatus, any misfeed of the recording sheet 1 in the conveyor path 15 is difficult to rectify since each of the feed rollers 5 and 6 and the like all have the same drive source.

In addition, in a conventional recording sheet conveyor apparatus, the conveyor path 15 is generally provided with a guide plate to guide the recording sheet 1. In the case where a guide plate is provided, a moving recording sheet 1 comes into contact with the inner wall surfaces of the guide plate and the surface of the recording sheet 1 is marked or scratched and static electricity is generated. This static electricity also becomes a cause of recording sheet 1 misfeeds.

SUMMARY OF THE INVENTION

Accordingly, it is a general object of the present invention to provide a novel and useful recording sheet conveyor apparatus for a information recording apparatus, in which the problems described heretofore are eliminated.

A more specific object of the present invention is to provide a recording sheet conveyor apparatus with as little vibration as possible when recording is being performed.

The above object can be achieved by a recording sheet conveyor apparatus in an image recording apparatus having recording sheet housing means for housing a recording sheet, information recording means for recording image information on the moving recording sheet that is drawn out of said recording sheet housing means, and sheet receiving means for receiving the sheet after image information has been recorded to it comprising, a conveyor path provided between the recording sheet housing means and the sheet receiving means, a main roller rotated by a predetermined drive source and positioned along the conveyor path and in a vicinity of a position for recording by the information recording means, for feeding the recording sheet at a predetermined speed, a feed roller rotated by a predetermined drive source and provided along the conveyor path between the recording sheet housing means and the main roller, for feeding the recording sheet a toward said main roller, a discharge roller rotated by a drive source and provided along the conveyor path between the main roller and said sheet receiving means, for feeding the recording sheet to the sheet receiving means after recording is performed for it, and roller drive prohibit means for prohibiting at least one of the feed roller and the discharge roller in the range of recording sheet fed by the main roller, from being driven while the information recording means is performing recording.

Another object of the present invention is to provide a recording sheet conveyor apparatus for which the recording sheet can be easily set and for which rectification for misfed the recording sheet is simple.

This object can be achieved by a recording sheet conveyor apparatus in an image recording apparatus having recording sheet housing means for housing a recording sheet, information recording means for recording image information on the moving recording sheet that is drawn out of the recording sheet housing means, and sheet receiving means for receiving the sheet after image information is recorded to it comprising, a conveyor path provided between the recording sheet housing means and the sheet receiving means, a main roller rotated by a predetermined drive source and positioned along the conveyor path and in a vicinity of a position for recording by the information recording means, for feeding the recording sheet at a predetermined speed, a feed roller rotated by a drive source and provided along the conveyor path between the recording sheet housing means and the main roller, for feeding said recording sheet toward the main roller, a discharge roller rotated by a drive source and provided along the conveyor path between the main roller and the sheet receiving means, for feeding the recording sheet to the sheet receiving means after recording is performed for it, and clutch means for coupling drive source and at least one of the feed roller and the discharge roller and for separating the drive source from at least one of the feed roller and the discharge roller.

The above object can be achieved by a recording sheet conveyor apparatus in an image recording apparatus having recording sheet housing means for housing a recording sheet, information recording means for recording image information on the moving recording sheet that is drawn out of the recording sheet housing means, and sheet receiving means for receiving the sheet after image information has been recorded to it comprising, a conveyor path provided between the recording sheet housing means and the sheet receiving means, a main roller rotated by a drive source and positioned along the conveyor path and in a vicinity of a position for recording by the information recording means, for feeding the recording sheet at a predetermined speed, a plural number of feed rollers provided along the conveyor path between the recording sheet housing means and the main roller, each of the feed rollers having a drive roller rotationally driven by the drive source, and a nip roller holding the recording sheet together with the drive roller and rotating along with the rotation of the drive roller, to transport the recording sheet toward the main roller, a discharge roller rotated by a predetermined drive source and provided along the conveyor path between the main roller and the sheet receiving means, the discharge roller feeding the recording sheet to the sheet receiving means after recording has been performed for it, contacting and separating means provided for the feed roller closest to the recording sheet housing means, for contacting and separating the nip roller with and from a drive roller, and clutch means provided for other feed rollers, for contacting and separating the drive source with and from the other feed rollers.

The above object can be achieved by a recording sheet conveyor apparatus in an image recording apparatus having recording sheet housing means for housing a recording sheet, information recording means for recording image information on the moving recording sheet that is drawn out of the recording sheet housing means, and sheet receiving means for receiving the sheet after image information has been recorded to it comprising, a conveyor path provided between the recording sheet housing means and the sheet receiving means, a main roller rotated by a drive source and positioned along the conveyor path and in a vicinity of a position for recording by the information recording means, for feeding the recording sheet at a predetermined speed, a plural number of feed rollers provided along the conveyor path between the recording sheet housing means and the main roller, each of the feed rollers having a drive roller rotationally driven by the drive source, and a nip roller holding a recording sheet together with the drive roller and rotating along with the rotation of the drive roller, to feed the recording sheet toward the main roller, a discharge roller rotated by a drive source, and provided along the conveyor path between the main roller and the sheet receiving means, for feeding the recording sheet to the sheet receiving means after recording has been performed for it, contacting and separating means provided for all feed rollers for contacting and separating a nip roller with and from the drive roller.

Furthermore, another object of the invention is to provide a recording sheet conveyor apparatus in which a recording sheet that is being conveyed does not come into contact with guide plates provided along the conveyor path.

The above object can be achieved by a recording sheet conveyor apparatus in an image recording apparatus having recording sheet housing means for housing a recording sheet, information recording means for recording image information on the moving recording sheet that is drawn out of the recording sheet hosing means, and a sheet receiving means for receiving the sheet after image information has been recorded to it comprising, a conveyor path provided between the recording sheet housing means and the sheet receiving means, a main roller rotated by a drive source and positioned along the conveyor path and in a vicinity of a position for recording by the information recording means, for feeding the recording sheet at a predetermined speed, a feed roller rotated by a drive source and provided along the conveyor path between the recording sheet housing means and the main roller, for feeding the recording sheet in the direction of the main roller, a discharge roller rotated by a drive source, and provided along the conveyor path between the main roller and the sheet receiving means, for feeding the recording sheet to the sheet receiving means after recording has been performed for it, a pair of first and second guide plates provided along the conveyor path and disposed so that the recording sheets being conveyed passes between them, and roller means projecting from the first guide plate in the direction of the second guide plate and for coming into contact with a recording sheet, so as to be freely rotatable in the direction of movement of the recording sheet, for supporting the recording sheet.

DESCRIPTION OF THE PREFERRED EMBODIMENT

Figure 1:
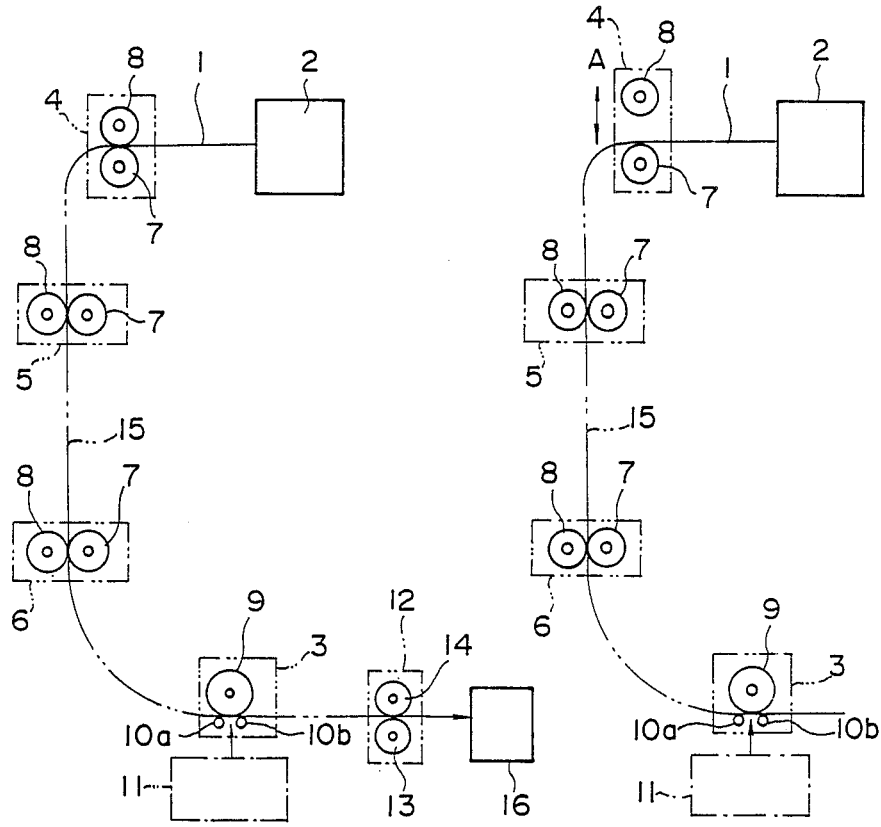
FIG. 1A and FIG. 1B are views indicating a conventional recording sheet conveyor apparatus.
Figure 2:
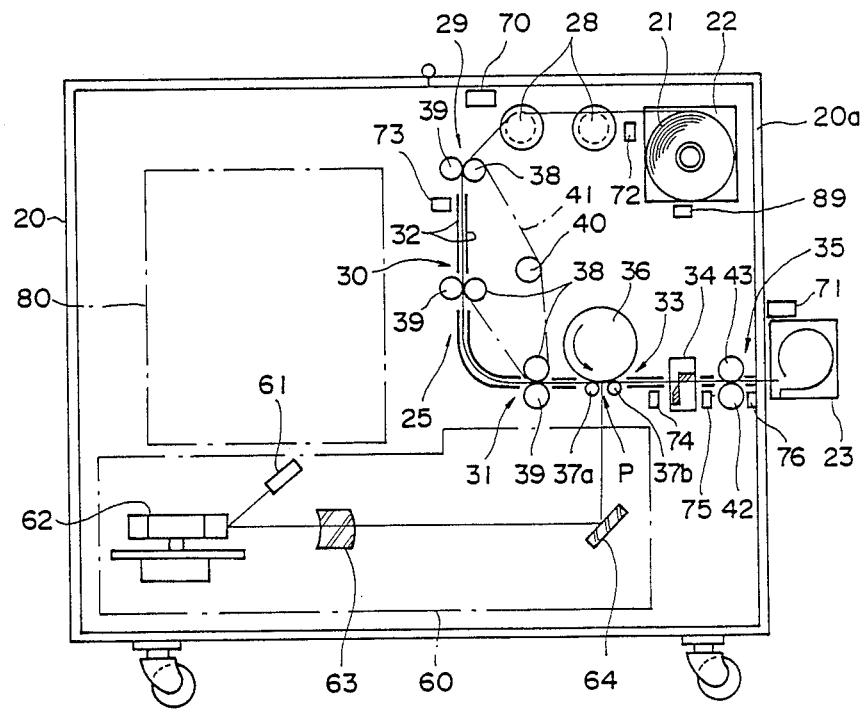
FIG. 2 is a view indicating an embodiment of the information recording apparatus to which the recording sheet conveyor means according to the present invention has been applied.

FIG. 2 illustrates an example of the configuration of the entire body of an information recording apparatus (such as a laser beam recorder) to which the recording sheet conveyor apparatus according to the present invention has been applied. FIG. 2 illustrates the internal configuration of the entire main unit 20.

A film cassette 22 houses a silver halide film 21 (recording sheet; hereinafter simply referred to as film 21) which is the recording medium in a roll shape. The film cassette 22 is processed so that it is lightproof and can be mounted and dismounted to and from the main unit 20 by opening a cover 20a. Also provided are a conveyor path 25 for conveying in the direction of a film eject cassette 23 the film 21 that has been drawn out from a film cassette 22, a laser recording unit 60 which is the recording portion for recording image information onto the film 21 and a control portion 80 to perform control of the feed motor and the like to be described later.

The conveyor path 25 is provided with two flanged rollers 28 that have flanges mounted on both sides, feed rollers 29 through 31, a main roller 33, a cutter 34 which is a guide portion and a discharge roller 35. In addition, the laser recording unit 60 comprises a semiconductor laser 61, a polygonal mirror 62, a fθ lens 63, a line mirror 64 and the like, with an exposure position P where the laser beam is irradiated to the film 21 is set a position on the main roller 33.

The main roller 33 is provided with a main drive roller 36 that is driven by the rotation of a main motor (a DC servo-motor), and a pair of nip rollers 37a and 37b that rotate in accordance with the rotation of the main drive roller 36 and that hold the film along with the main drive roller 36. Each of the feed rollers 29 through 31 are provided with a drive roller 38 and a nip roller 39. The nip roller 39 holds the film 21 together with a drive roller 38 driven by a feed motor 40 (a stepping motor), and rotates in accordance with the rotation of the drive roller 38.

The conveyor path 25 is suitably provided with guide plates 32 disposed so as to hold the film 21 on the conveyor path 25. A cover sensor 70 to detect the status of opening and closing of the cover 20a of the main unit 20, a cassette sensor 71 to detect the mounted/dismounted status of the film eject cassette 23, and a sensor 89 to detect the mounted/dismounted status of the film cassette 22. In addition, at suitable positions on the conveyor path 25 are provided film sensors 72, 73, 74, 75 and 76.

Figure 3:
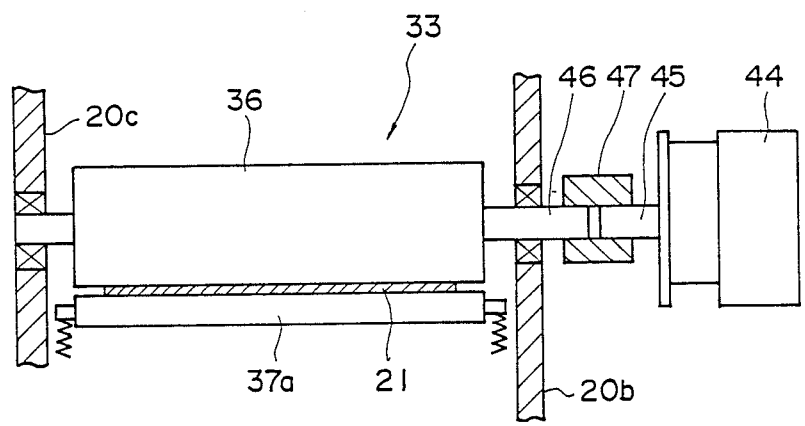
FIG. 3 is a view indicating the structure of a main roller.

FIG. 3 illustrates the specific structure of the main roller 33.

The side plates 20b and 20c of the main unit 20 support a main drive roller 36 so as to be freely rotatable, and the force of a spring or the like presses a pair of nip rollers 37a and 37b against this main drive roller 36.

The film 21 is held between the main drive roller 36 and the pair of nip rollers 37a and 37b. Above the shaft of the main drive roller 36 is disposed a servo-motor which is the main motor 44 and which has a planetary roller reduction mechanism. The motor shaft 45 of the main motor 44 and the rotating shaft 46 of the main drive roller 36 are directly linked by a coupling 47.

The structure of the servo-motor with the planetary roller reduction mechanism is disclosed in "Mitsubishi Heavy Industries Bulletin Vol. 22 No. 4(1985-7)." FIG.

4 is a view indicating the structure of the first feed roller.

Downstream from the flanged rollers 28 is provided the first feed roller 29. The feed roller 29 has a drive roller 38 and a nip roller 39 as has been described earlier: A pulley 51 and a solenoid clutch 52 are mounted to the rotating shaft 50 of the drive roller 38 and a belt 41 is wound between the pulley 51 and the pulley 49 provided on the motor shaft 48 of the feed motor 40. When the solenoid clutch 52 turns on, the pulley 51 and the rotating shaft 50 are fixed and the drive force of the feed motor 40 is transmitted to the drive roller 38 via the pulley 49, the belt 41, the pulley 51 and the rotating shaft 50. When the solenoid clutch 52 turns off, the fixing with the pulley 51 and the rotating shaft 50 is cancelled and the rotation drive force that is to be transferred from the feed motor 40 to the drive roller 38 is interrupted. The other feed rollers 30 and 31 have a similar structure.

Figure 5:
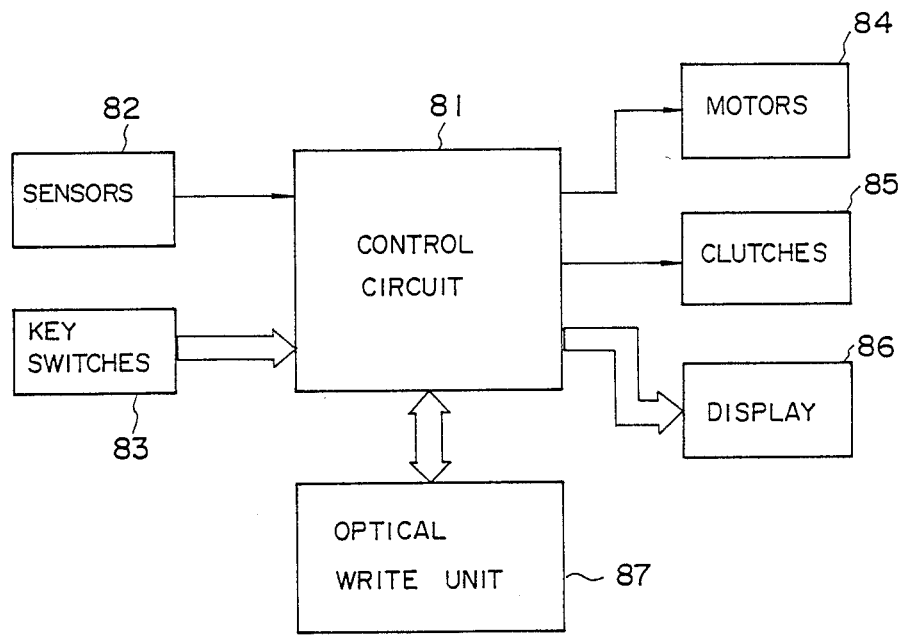
FIG. 5 is a block diagram indicating the configuration of the control portion.

FIG. 5 is a block diagram indicating the fundamental configuration of a control portion 80.

A control circuit 81 inputs the detect signals from the various types of sensors 82 (cover sensor 70, cassette sensor 71, film sensors 72 through 76, etc.) and the operation signals from key switches 83 provided on a console panel, etc. The control circuit 81 performs information exchange with an optical write unit 87 that performs control of the laser recording unit 60. The above-described detect signals and operation signals and the information from the optical write unit 87 is used as the basis for the control circuit 81 to perform drive control for the various types of clutches 85 and the various types of motors 84 (main motor 44, feed motor 40, etc.) and to perform display control of the display provided on the console panel, etc.

Figure 6A:
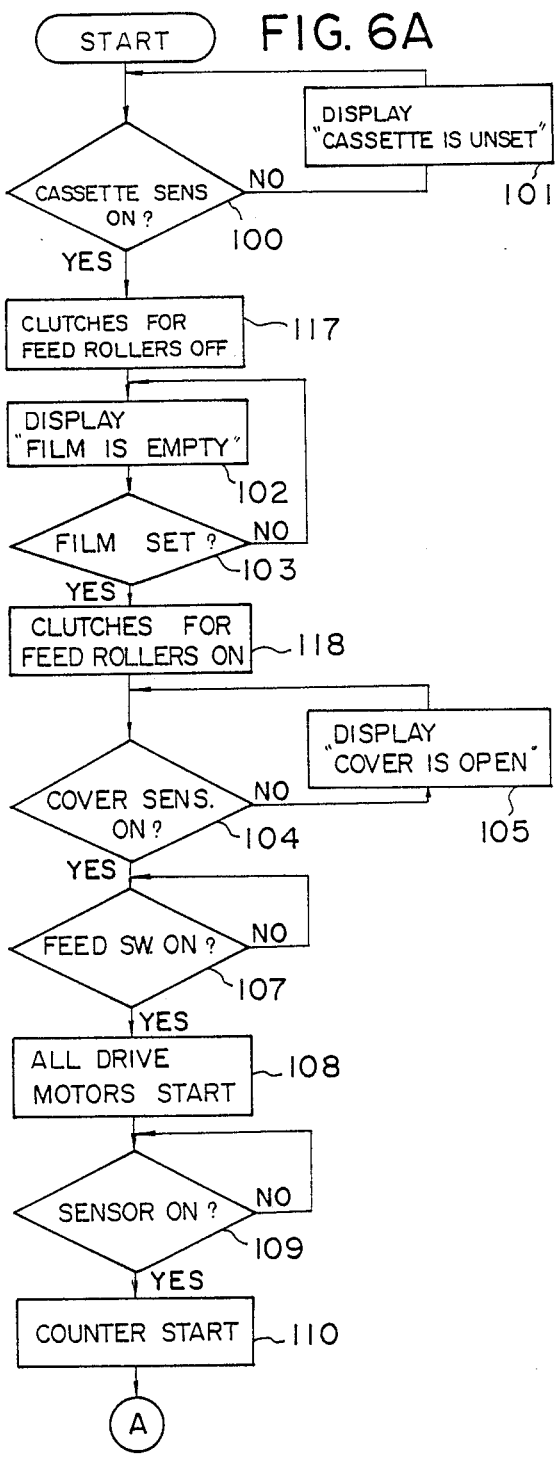
FIG. 6A and FIG. 6B are flow charts indicating the flow of processing when a recording sheet is mounted.
Figure 6B:
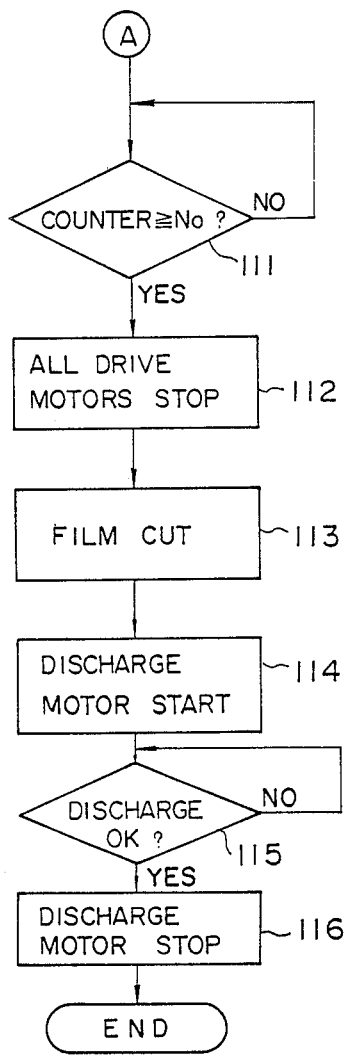

When film 21 is filled in the main unit 20, the control portion 80 performs processing in accordance with the flow charts indicated in FIG. 6A and FIG. 6B.

In the initial status, the clutches 52 provided on each of the feed rollers 29 through 31 are off, and the feed motor 40 of the feed rollers 39 through 31, the main motor 44 of the main roller 33 and the drive motor of the discharge roller 35 are stopped.

When processing starts (with START), there is confirmation as to whether or not the film cassette 22 and the film eject cassette 23 are set (STEP 100). When processing starts the clutches 52 are turned ON. If the cassette sensor 71 or the sensor 89 is in the OFF status, then "CASSETTE IS UNSET" is displayed in the display 86 (STEP 101). If the film cassette 22 and the film eject cassette 23 are set, then the cassette sensor 71 and the sensor 89 turn ON. The clutches 52 for the feed rollers 29 through 31 turn OFF based on signals from the sensors 71, 89 (STEP 117), and "FILM IS EMPTY" is displayed in the display 86 (STEP 102). Then, whether or not there is film 21 set is monitored on the basis of the detect signal from the film sensor 73 provided immediately after feed roller 29 (STEP 103). Here, the operator manually rotates the feed roller 29 when the clutch is in the OFF status, and inserts the film 21 drawn out from the film cassette 22, into between the drive roller 38 and the nip roller 39, and then rotates the feed roller 29 to manually feed the film 21. Then, when the film sensor 73 turns ON and the fact that film 21 is set is confirmed. The clutches 52 for the feed rollers 29 through 31 turn ON based on a signal from the film sensor 73 (STEP 118). Whether or not the cover 20a is closed is monitored on the basis of a signal from the cover sensor 70 (STEP 104). If the cover sensor 70 is in the OFF status, then "COVER IS OPEN" is displayed in the display 86 (STEP 105). When the cover 20a is closed, and the cover sensor 70 turns ON. Then control portion 80 is monitoring for whether or not the FEED SWITCH provided on the console panel or the like is turned ON (STEP 107). In the course of this monitoring processing for the above step 107, the "COVER IS OPEN" display in the display 86 is extinguished.

When the operator turns on the FEED SWITCH, that "ON" signal is used as the basis for each of the start motors of the feed rollers 29 through 31, the main roller 33 and the discharge roller 35 to start. When this occurs, the control portion 80 monitors the detect signals from a film sensor 74 provided immediately after the main roller 33 (STEP 109), and the film 21 in the conveyor path 25 is fed by the rotation drive of each of the rollers and a predetermined internal counter is started (STEP 110). Then, when the film 21 is in the conveyed status, and the count value of the counter reaches a predetermined numerical value $N_0$ (STEP 111), each of the motors stop (STEP 112) and a cutter 34 cuts the film 21 (STEP 113). Then the motor of the discharge roller 35 starts (STEP 114), and the film 21 cut by cutter 34 is fed by the rotation drive of the discharge roller 35. The control portion 80 monitors whether or not the film 21 is discharged from the conveyor path 25 into the film eject cassette 23 based on signals from sensor 74, 75 (STEP 115). Then, when the film 21 is discharged into the film eject cassette 23, the motor of the discharge roller 35 stops (STEP 116).

As has been described above, the processing finishes when the film 21 has been mounted into the main unit 20.

The predetermined numerical value $N_0$ in step 111 above, is set to a value that corresponds to the length of the film that was exposed when the film 21 was mounted.

As has been described above, the load on the drive roller 38 is lessened only when the solenoid clutches 52 of the feed rollers 29 through 31 are in the OFF status and so the manual rotation of the feed roller 29 to feed the film 21 is facilitated.

Figure 7A:
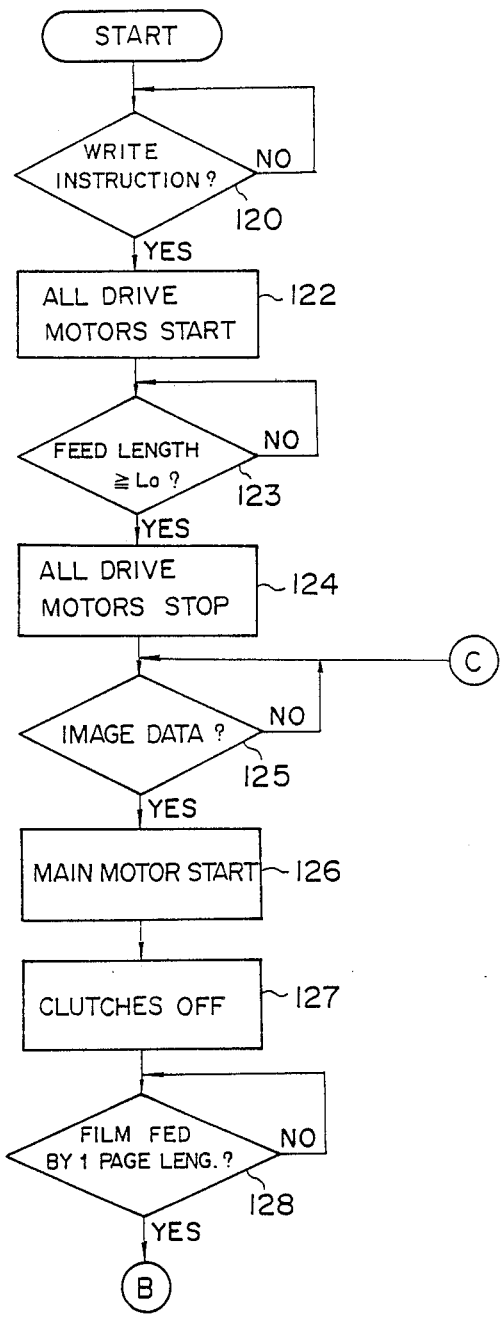
FIG. 7A and FIG. 7B are flow charts indicating the flow of processing when recording is performed.
Figure 7B:
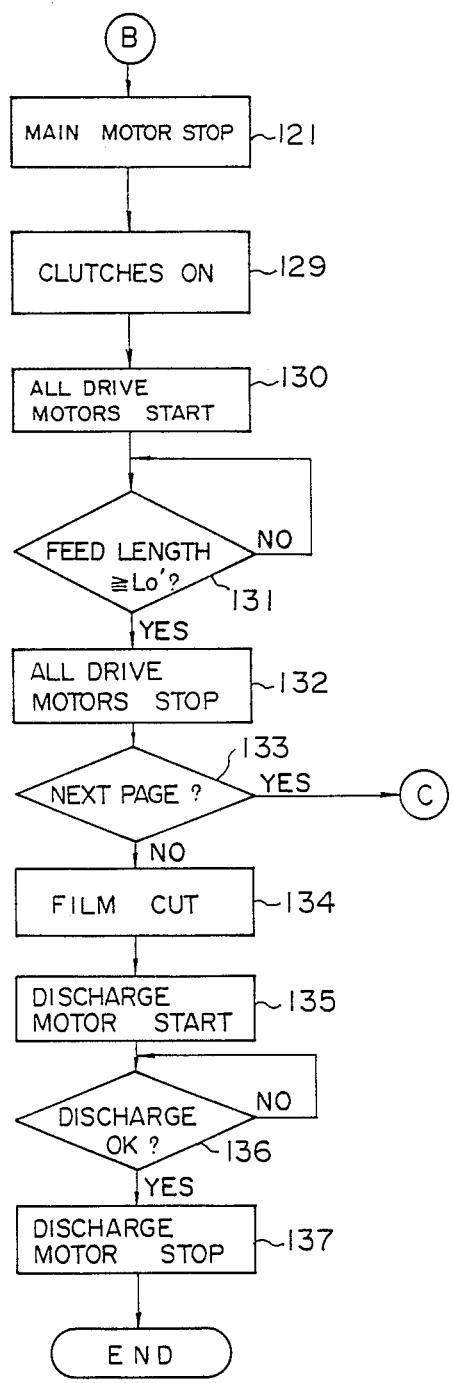

When recording with respect to the film 21 is performed, the control portion 80 performs processing in accordance with the flow charts of FIG. 7A and FIG. 7B.

In the initial status, each of the clutches 52 of the feed rollers 29 through 31 are in the ON status.

The control portion 80 monitors whether or not there is a write instruction from the optical write unit 87 (STEP 120). If there is a write instruction from the optical write unit 87, each of the drive motors of the feed rollers 29 through 31, the main roller 33 and the discharge roller 35 start (STEP 122). The start of each of the drive motors feeds the film 21 and the control portion 80 monitors the feed length (STEP 123). When this feed length becomes a length $L_0$ corresponding to the blank front end of the first page (STEP 123), each of the drive motors stop (STEP 124). Next, the control portion 80 monitors whether or not image data has been sent from the optical write unit 87 (STEP 125) and if image data has been sent, then only the main motor 44 for driving the main roller 33 starts (STEP 126), and the clutch 52 of each the feed rollers 29 through 31 are turned OFF (STEP 127). When this occurs, the feed motor 40 of each of the feed rollers 29 through 31 are held in the stop status and the clutch 52 is held in the OFF status. That is to say that the drive of the feed rollers 29 through 31 are prohibited.

While the film 21 is being sent by the main roller 33, the control portion 80 monitors whether or not the length of film 21 that has been sent has become one page (STEP 128). When a one-page length of film has been sent, the image recording by the laser recording unit 60 is interrupted and the main motor 44 is stopped (STEP 121). Then the clutches of each of the feed rollers 29 through 31 are turned ON (STEP 129) and the feed motor 40, the main motor 44 and the discharge motor start (STEP 130).

The film 21 is sent in the status where the main roller 33 and the feed rollers 29 through 31 are moving. When the length of feed becomes a length $L_0'$ equivalent to the blank at the front end of the next page (STEP 131), all of the drive motors are stopped (STEP 132). Then, if there is information for recording on the next page (STEP 133), then the processing in STEP 125 through STEP 133 described above are repeated. If there is no information for recording on the next page (STEP 133), the cutter 34 cuts off one-page length of the film 21 (STEP 134). Then, the motor of the discharge roller 35 starts (STEP 135), and the film 21 cut by cutter 34 is fed by the rotation drive of the discharge roller 35. The control portion 80 monitors where or not the film 21 is discharged from the conveyor path 25 into the film eject cassette 23 based on signals from sensor 74, 75 (STEP 136). When the film 25 is discharged into the film eject cassette 23, the motor of the discharge roller 35 stops (STEP 137).

With the processing described above, each of the feed rollers 29 through 31 have their clutches turned OFF while there is recording, and the film 21 moves around with the feed rollers. . When this occurs, the feed motor 40 and the belt 41 and the like are not rotating and so the occurrence of vibration is prevented. Accordingly, deterioration of the image quality attributable to vibration from the rotation of the feed motor 40 and the like is therefore prevented.

In addition, the use of a servo-motor having a planetary roller reduction mechanism as the main motor 44 of the main roller 33 that feeds the film 21 means that the motor shaft 45 of the main motor 44 and the rotating shaft 46 of the main drive roller 36 can be directly connected so that there is extremely little variation in the speed of movement of the film 21 during recording. Accordingly, the quality of the image can be further improved.

Moreover, the control portion 80 uses the detect signals from each of the film sensors 72 through 76 as the basis for determining whether or not there is film misfeed inside the conveyor path 25. If there is then film misfeed inside the conveyor path 25, then the power supply to the entire conveyance system is interrupted so that the clutches 52 of the feed rollers 29 through 31 are also placed in the OFF status to facilitate the removal of the film 21.

Each of the feed rollers 29 through 31 are provided with a advance and retreat mechanism to advance and retreat the nip roller 39 to and from the drive roller 38 and therefore also prevent vibration of the film 21.

Figure 8A:
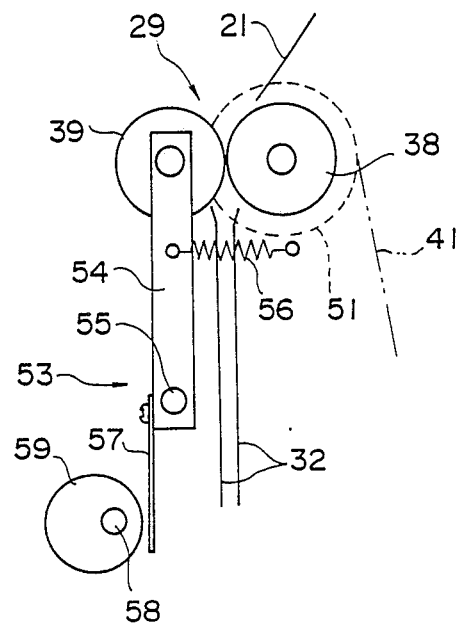
FIG. 8A, FIG. 8B and FIG. 9 are views showing the structure of a feed roller.
Figure 8B:
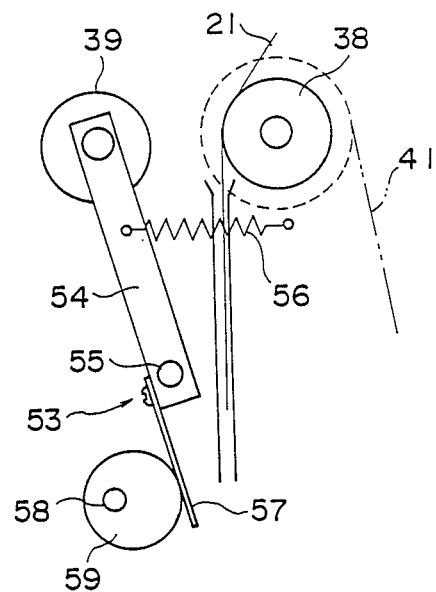
Figure 9:
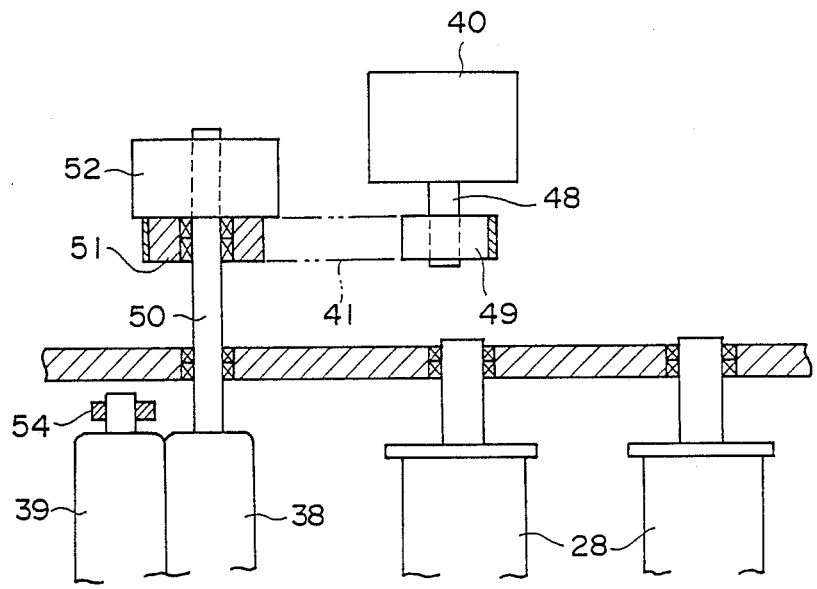

FIG. 8A, FIG. 8B and FIG. 9 are views indicating the status when this advance and retreat mechanism 53 is provided to the feed rollers 29 through 31.

The feed rollers 29 through 31 have the nip roller 39 supported at one end of a lever 54 so as to be freely rotatable, and the other end of this lever 54 is supported by a support shaft 55 so as to be freely rotatable. One end of a spring 56 is fixed to a lever 54 so that the lever 54 is urged so that the nip roller 39 is brought into contact with the outer circumferential surface of the drive roller 38. Moreover, the other end of the lever 54 is fixed to a plate 57 that extends in the direction opposite the nip roller 39 and which holds the support shaft 55. To the top of the leading end of this receiving plate 57 is provided an eccentric cam 59 which is fixed to a motor shaft 58 of a motor (not indicated in the figure) controlled by the control portion 80. Then, the lever 54, the spring 56 and the plate 57, and the eccentric cam 59 and the like comprise the advance and retreat mechanism 53 that advances and retreats the nip roller 39 to and from the outer circumferential surface of the drive roller 38. In this advance and retreat mechanism 53, the eccentric cam 59 rotates 180° around the axis of the motor shaft 58 due to the movement of the motor from the status indicated in FIG. 8A. Then, the outer circumferential surface of the large-diameter portion of the eccentric cam 59 comes into contact with the plate 57 and the plate 57 and the lever 54 rotate around the outer circumferential surface of the support shaft 55 as shown in FIG. 8B, and the nip roller 39 separate from the outer circumferential surface of the drive roller 38.

In the course of processing when the film 21 is mounted as shown in FIG. 6A and FIG. 6B, this advance and retreat mechanism 53 is controlled by a drive motor so that in the status shown in FIG. 8A at the timing when the solenoid clutch 52 is ON, and in status shown in FIG. 8B at the timing when the solenoid clutch 52 is OFF. Accordingly, when the solenoid clutch 52 is OFF and is in the status where drive transmission is interrupted and each of the feed rollers 29 through 31 is idling, the nip roller 39 of each of the feed rollers 29 through 31 are in the status where they are retreated from the drive roller 38.

Then, the leading edge of the film 21 is inserted between the retreated drive roller 38 and the nip roller 39 and then the movement of the motor causes the eccentric cam 59 to rotate 180° around the axis of the eccentric cam 59. This rotation causes the small-diameter portion of the eccentric cam 59 to enter the status where it is opposite the lever 54 so that the eccentric cam 59 retreats from the lever 54, and the tensile force of a spring 56 causes the lever 54 to rotate so that the nip roller 39 is brought into contact with the outer circumferential surface of the drive roller 38 and the mounting of the film 21 is completed. At the time when this film 21 is mounted the nip roller 39 and the drive roller 38 are separated and the film 21 is in the feed rollers 29 through 31. (the feed rollers 29 through 31) are idling (in the status where the clutch is disengaged) so as to further facilitate the mounting of the film.

When the film 21 is being conveyed and when recording is being performed, the advance and retreat mechanism 53 is generally in the status shown in FIG. 8A where the nip roller 39 is controlled in order to maintain the status where they are in contact with the drive roller 38. In addition, it is also possible to control the nip roller 39 to retreat from the drive roller 38 when the film 21 is being conveyed and in particular, when recording is being performed. In this case, in the course of processing indicated in FIG. 7A and FIG. 7B, the drive motor of the eccentric cam 59 is controlled at the timing when the solenoid clutch 52 is ON as indicated in FIG. 7A and at the timing when the solenoid clutch 52 is OFF.

In this way, the feed rollers 29 through 31 during recording is such that in the status when the solenoid clutch 52 is turned OFF and the transmission of the drive force is interrupted and the advance and retreat mechanism 53 retreats the nip roller 39 of each of the feed rollers 29 through 31 away from the drive roller 38, the occurrence of vibration due to the rotation of the feed motor 40 and the like is prevented and the nip pressure of the nip roller 39 does not act to the film 21. By this, the variation in the load acting on the film 21 is reduced and the quality of the image is improved.

In addition, when a film misfeed occurs, the advance and retreat mechanism 53 of each of the feed rollers 29 through 31 is controlled to retreat the nip roller 39 from the drive roller 38 as indicated in FIG. 8B and then the power supply to the conveyor system is interrupted. When this occurs, the advance and retreat mechanism 53 causes the nip roller 39 to enter the status where it is retreated from the outer circumferential surface of the drive roller 38 and the solenoid clutch 52 interrupts the transmission of the drive force. Accordingly, the removal of the misfed film 21 from the conveyor path 25 is facilitated.

Moreover, a uni-directional clutch can be used in place of the solenoid clutch 52 and in this case, the sequence control and the apparatus are simplified and cost reductions can be made.

This description of the embodiment has been given in terms of the feed rollers 29 through 31 but is also possible to provide the discharge roller 35 with a solenoid clutch, and an advance and retreat mechanism in a similar manner.

Figure 10:
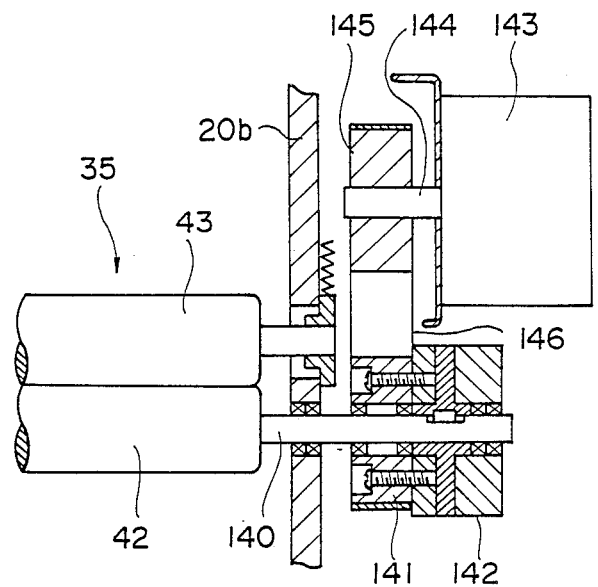
FIG. 10 is a view showing the structure of a discharge roller.

FIG. 10 indicates the configuration of a discharge roller 35 provided with a clutch.

The discharge roller 35 is provided with a drive roller 42 supported by the side plate 20b of the main unit 20 so as to be freely rotatable, and a nip roller 43 that is pressed against the outer circumferential surface of the drive roller 42. The rotating shaft 140 of the drive roller 42 has mounted to it a freely rotatable pulley 141 and a solenoid clutch 142 that is a clutch controlled by the control portion 80. In addition, a motor 143 is provided as a drive portion and a belt 146 for the transmission of the drive force is wound around a pulley 145 fixed to the motor shaft 144 of the discharge motor 143, and the pulley 141.

During recording, a discharge roller 35 having a configuration such as this is controlled by the solenoid clutch 142 and the discharge motor 143 in the same flow as is shown in FIG. 7A and FIG. 7B.

During recording to the film 21, the control from the control portion 80 causes the solenoid clutch 142 to enter the status whereby it interrupts the transmission of the drive force and the solenoid clutch 52 mounted to the rotating shaft of the drive roller 38 for each of the feed rollers 29 through 31 is also controlled from the control portion 80 so that there is the status whereby the transmission of the drive force is interrupted. The driving of the main motor 44 rotates the main drive roller 36 so that the conveyance of the film to which recording is being made, is performed by the main roller 33 only, with the discharge roller 35 and the feed rollers 29 through 31 being in the idle status. Accordingly, the occurrence of vibration accompanying the rotation of the discharge motor 143 and the feed motor 40 is prevented along with variations in the film 21 feed speed caused by such vibration. Because of this, differences in the density in the secondary scanning direction due to variations in the film 21 feed speed are prevented and the quality of the recorded image is improved.

In addition, when the film 21 has been misfed inside the conveyor path 25, the power supply to the solenoid clutch 142 of the discharge roller 35 is interrupted as for each of the feed rollers 29 through 31. Accordingly, the solenoid clutch 142 enters the status where it interrupts the transmission of the drive force at the same time as the solenoid clutch 52 mounted to the rotating shaft 50 of the drive roller 38. By this, the feed rollers 29 through 31 and the discharge roller 35 enter the idle status and the removal of the misfed film 21 from the conveyor path 25 is facilitated.

Figure 11A:
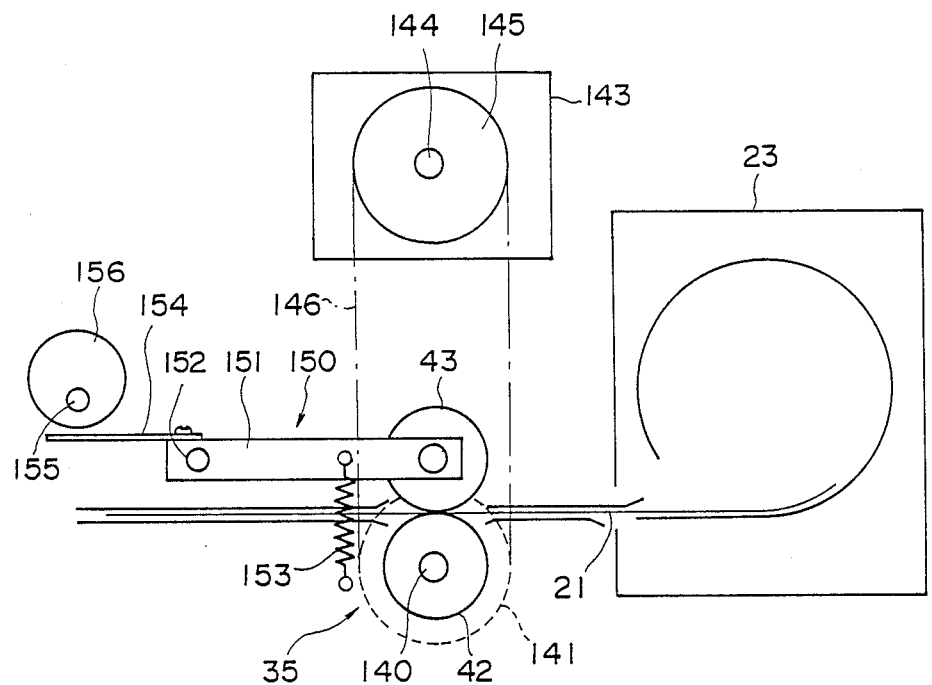
FIG. 11A and FIG. 11B are views showing the operation of a discharge roller.
Figure 11B:
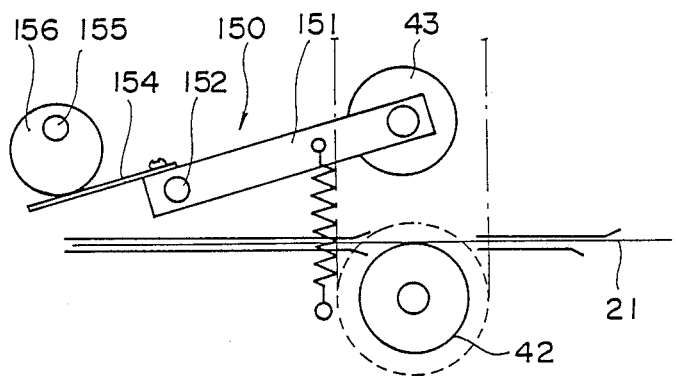

FIG. 11A an FIG. 11B indicate the configuration of the advance and retreat mechanism provided for the discharge roller 35.

Moreover, the corresponding explanation has been omitted for portions in FIG. 2 and FIG. 10 and which have already been explained. The nip roller 43 of the discharge roller 35 is supported by one end of a lever 151 so as to be freely rotatable, and the other end of this lever 151 is supported by a support shaft 152 around which it is freely rotatable. One end of a spring 153 is fixed to a lever 151 so that the lever 151 is urged so that the nip roller 43 is brought into contact with the outer circumferential surface of the drive roller 42. Moreover, the other end of the lever 151 is fixed to a plate 154 that extends in the direction opposite the nip roller 43 and which holds the support shaft 152. To the top of the leading end of this receiving plate 154 is provided an eccentric cam 156 which is fixed to a motor shaft 155 of a motor (not indicated in the figure). Then, the lever 151, the spring 153 and the plate 154, and the eccentric cam 156 and the like comprise the advance and retreat mechanism 150 that advances and retreats the nip roller 43 to and from the outer circumferential surface of the drive roller 42.

In this way, the advance and retreat mechanism 150 is such that the eccentric cam 156 controlled so that at the timing when the solenoid clutch 52 of the feed rollers 29 through 31 is ON, the nip roller 43 is advanced to be brought into contact with the drive roller 42 (FIG. 11A) and the nip roller 43 is retreated to separate from the drive roller 42 at the timing when the solenoid clutch 52 is OFF. Accordingly, load variations acting upon the film 21 at the discharge roller 35 are prevented and variations in the feed speed of the film 21 are prevented. Because of this, nonuniformity in the density in the secondary scanning direction due to variations in the film 21 feed speed are prevented and the quality of the recorded image is improved.

In addition, when the film 21 has been misfed inside the conveyor path 25, the power supply to the solenoid clutch 142 of the discharge roller 35 is interrupted as for each of the feed rollers 29 through 31, so that the advance and retreat mechanism 150 is controlled so as to separate the nip roller 43 from the drive roller 42. This facilitates the removal of the misfed film 21.

Figure 12:
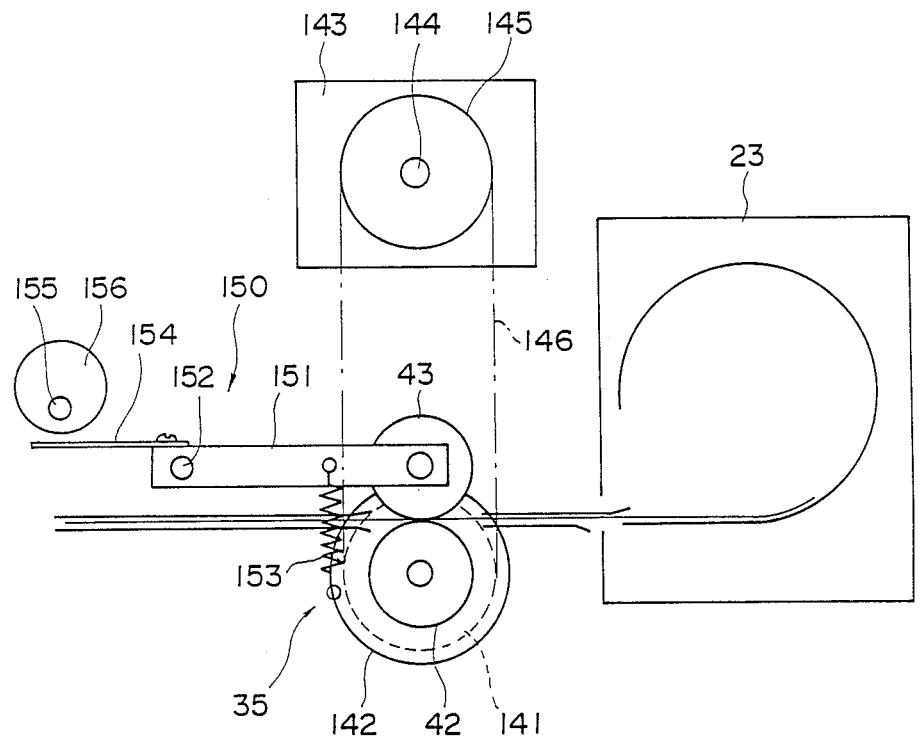
FIG. 12 and FIG. 13 are views showing an alternative structure for a discharge roller.
Figure 13:
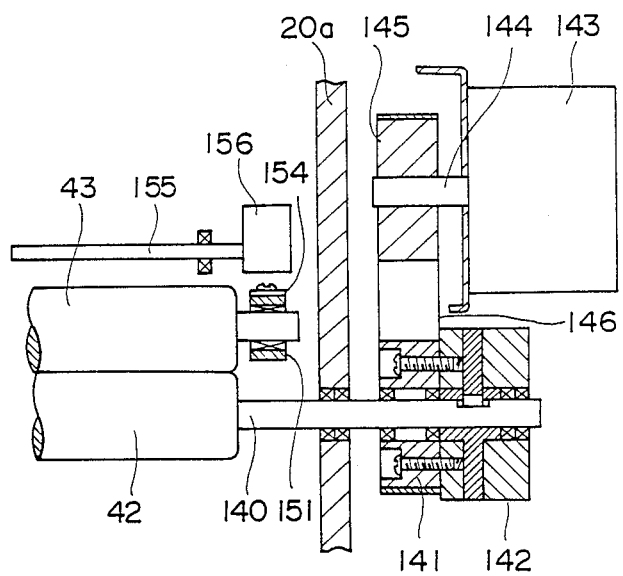

FIG. 12 and FIG. 13 indicate the configuration of the solenoid clutches and the advance and retreat mechanism provided for the discharge roller 35.

In this embodiment of the present invention, there is provided a solenoid clutch 142 above the rotating shaft 140 of the drive roller 42 and a advance and retreat mechanism 150 is provided so that the nip roller 43 is advanced and retreated to and from the outer circumferential surface of the drive roller 42.

The structure of the solenoid clutch 142 and the advance and retreat mechanism 150 are the same as indicated in FIG. 11A and FIG. 11B.

During recording, the solenoid clutch 142 interrupts the transmission of the drive force and the advance and retreat mechanism 150 advances the nip roller 43 to bring it into contact with the outer circumferential surface of the drive roller 42.

In addition, when the film 21 is misfed inside the conveyor path 25, the solenoid clutch 142 interrupts the transmission of the drive force and the advance and retreat mechanism 150 retreats the nip roller 43 to separate it from the outer circumferential surface of the drive roller 42. By this, the discharge roller 35 enters the idle status and a gap is created between the nip roller 43 and the drive roller 42 so that the removal of the misfed film 21 from the conveyor path 25 is facilitated.

Figure 14:
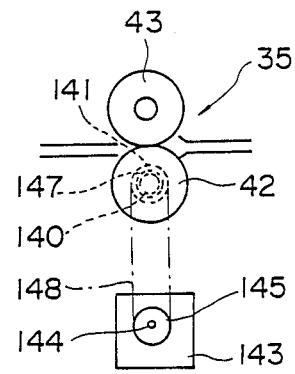
FIG. 14 is a view showing an example of a drive source for a discharge roller.

FIG. 14 is a view indicating another position for the provision of the discharge motor 143 that is the drive source for the discharge roller 35.

The discharge motor 143 can be provided at the lower portion of the drive roller 42 and not on the side of the nip roller 43 (FIG. 11A, FIG. 12), as indicated in FIG. 14.

In FIG. 14, the rotating shaft 140 of the drive roller 42 is provided with the pulley 141 and an uni-directional clutch 147 in place of the solenoid clutch 142. A belt 148 is wound between the pulley 141 and the pulley 145 provided on the motor shaft 144 of the discharge motor 143.

Figure 4:
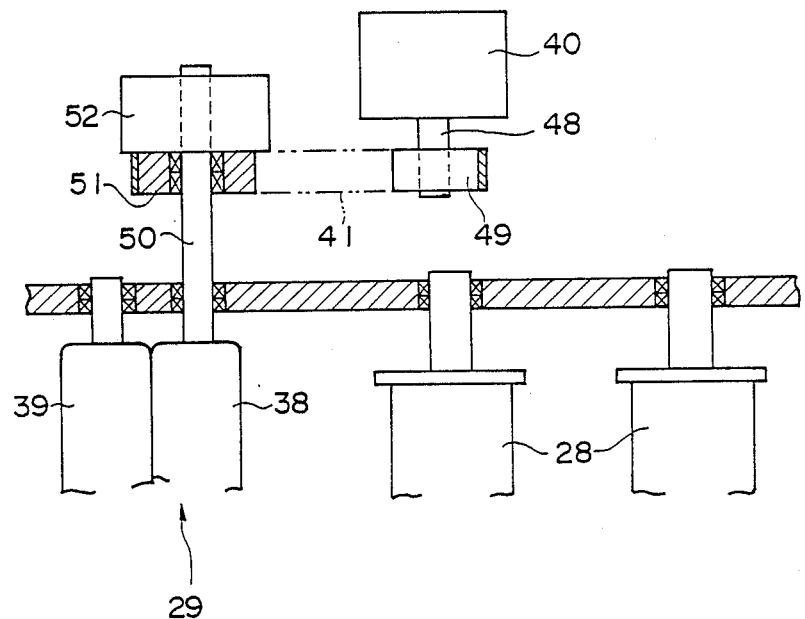
FIG. 4 is a view indicating the structure of a feed roller.

As a result of the uni-directional clutch 147 in place of the solenoid clutch 142, the sequence control and the structure are simplified and cost reduction can be made as in the case of modifications of the solenoid clutch 52 of the embodiments shown in FIG. 4 and FIG. 9.

Figure 15:
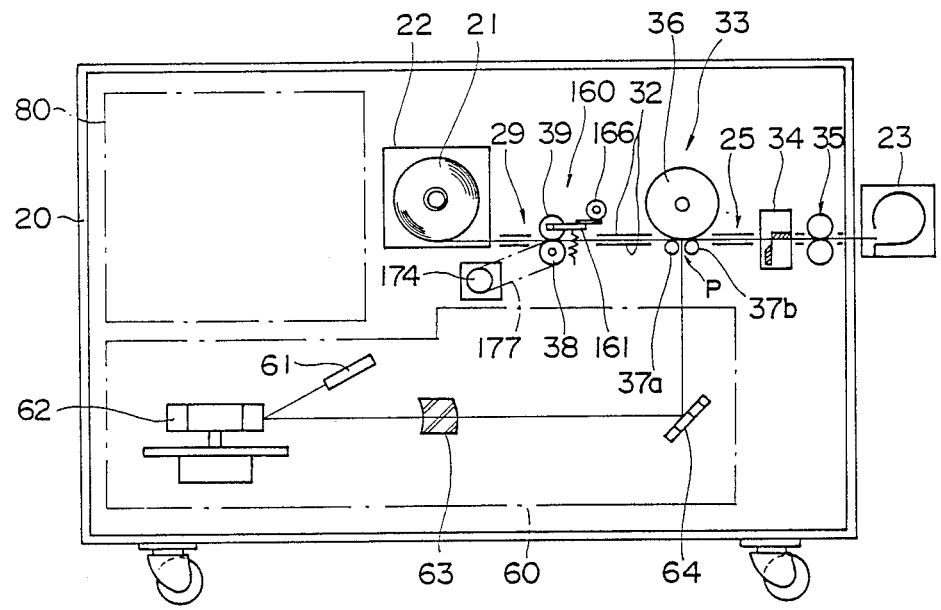
FIG. 15 is a view showing another embodiment of the information recording apparatus to which the recording sheet conveyor means according to the present invention has been applied.

FIG. 15 indicates an alternative embodiment of an information recording apparatus to which the information sheet conveyance apparatus of the present invention has been applied.

In this embodiment, the conveyor path 25 formed between the film cassette 22 and the film eject cassette 23 differs from the one indicated in FIG. 2 in that is linear in shape, with a short length.

Basically, the structure is the same as that indicated in FIG. 2 but because the length of the conveyor path 25 is short, this embodiment only has one feed roller 29 in the space between the film cassette 22 and the main roller 33.

The following is a description of the configuration of the feed roller 29, given with reference to FIG. 15, FIG. 16A, FIG. 16B and FIG. 17.

Figure 16A:
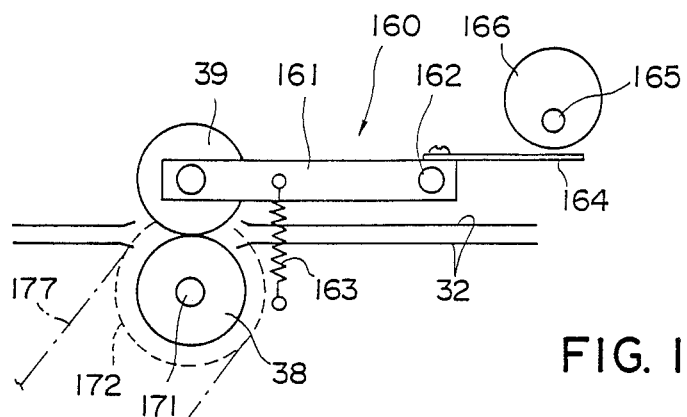
FIG. 16A, FIG. 16B and FIG. 17 are views showing the structure of a feed roller.
Figure 16B:
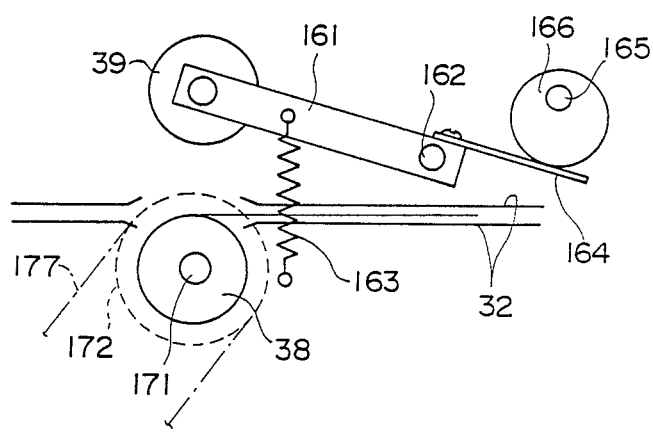
Figure 17:
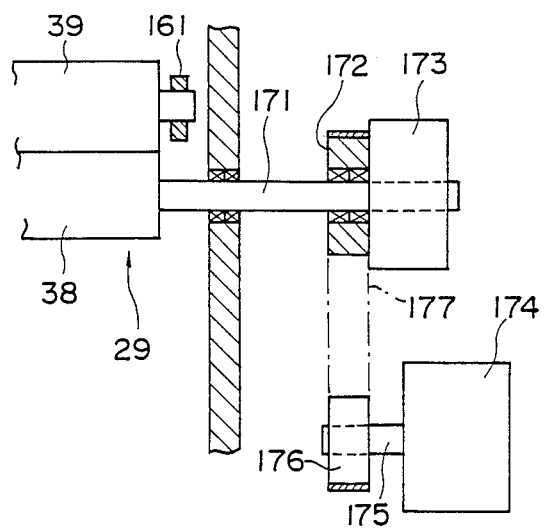

As shown in FIG. 15, FIG. 16A, FIG. 16B and FIG. 17, the feed roller 29 has a drive roller 38 and a nip roller 39 in contact with the outer circumferential surface of the drive roller 38. In addition, the nip roller 39 is supported so as to be freely rotatable at one end of a lever 161 and the other end of this lever 161 is supported by a support shaft 162 around which it is freely rotatable. One end of a spring 163 is fixed to a lever 161 so that the lever 161 is urged so that the nip roller 39 is brought into contact with the outer circumferential surface of the drive roller 38. Moreover, the other end of the lever 161 is fixed to a plate 164 that extends in the direction opposite the nip roller 39 and which holds the support shaft 162. To the top of the leading end of this receiving plate 164 is provided an eccentric cam 166 which is fixed to a motor shaft 165 of a motor (not indicated in the figure) controlled by the control portion 80. Then, the lever 161, the spring 163 and the plate 164, and the eccentric cam 166 and the like comprise the advance and retreat mechanism 160 that advances and retreats the nip roller 39 to and from the outer circumferential surface of the drive roller 38. Next, as shown in FIG. 15 and FIG. 17, the rotating shaft 171 of the drive roller 38 for the feed roller 29 has mounted to it a pulley 172 and solenoid clutch 173 controlled by the control portion 80. In addition, a feed motor 174 (is a stepping motor) which is the drive portion controlled by the control portion 80 is also provided and between the pulley 172 and the pulley 176 fixed to the motor shaft 175 of this feed motor 174 is wound a belt 177 for transmission of the drive force.

In this configuration, as shown for the recording apparatus indicated in FIG. 15, the film 21 drawn out from the film cassette 22 is conveyed along the conveyor path 25 and recording of image information is performed by irradiating a laser beam at the recording position P. The film 21 for which recording of the image information has been carried out is cut to a predetermined length by the cutter 34 and discharged to the film eject cassette 23.

When the film 21 is mounted as described earlier, the advance and retreat mechanism 160 is controlled so that the nip roller 39 retreats from the drive roller 38, and the solenoid clutch 173 is controlled so as to interrupt the transmission of the drive force. In this status, the film 21 drawn out of the film cassette 22 is inserted between the nip roller 39 and the drive roller 38. Then, the advance and retreat mechanism 160 is controlled so that the nip roller 39 advances to be brought into contact with the drive roller 38 and the mounting of the film 21 is completed.

When the film 21 is mounted, the advance and retreat mechanism 160 is controlled so that the nip roller 39 is in contact with the drive roller 38 and the solenoid clutch 173 is controlled so that the drive force is transmitted. The film 21 is conveyed by the drive forces of the nip roller 39 and the feed roller 29.

When the film 21 is being conveyed and when recording is being performed, the advance and retreat mechanism 160 controlled to be in the status where the nip roller 39 is in contact with the drive roller 38 and the solenoid clutch 173 is controlled so that the drive force is interrupted. By this, the film 21 is conveyed by only the main roller 33.

When recording is performed to film 21 which is some other status, the advance and retreat mechanism 160 is controlled so that the nip roller 39 is retreated from the drive roller 38. By this, the nip pressure of the nip roller 39 does not act to the film 21 and so variation in the load acting on the film 21 is reduced and the quality of the image is improved.

In addition, when a misfeed of the film 21 in the conveyor path 25 occurs, feed motor 174 of the feed roller 29 interrupts the transmission of the drive force and at the same time the advance and retreat mechanism 160 is controlled to retreat the nip roller 39 from the drive roller 38.

By this, the feed roller 29 enters the idle status and a gap is created between the nip roller 39 and the drive roller 38 so that the removal of the misfed film 21 from the conveyor path 25 is facilitated.

In order to prevent the interruption of recording due to there being no more film 21 in the film cassette 22, the conveyor path 25 is comparatively short as shown in FIG. 2 so that at least one page of recording can be performed after the film sensor 72 in FIG. 2 has detected the trailing end of the film 21. In this manner, a plural number (three in FIG. 2) of feed rollers are provided between the film cassette 22 and the main roller 33 so that the conveyor path 25 can be made longer.

Figure 18:
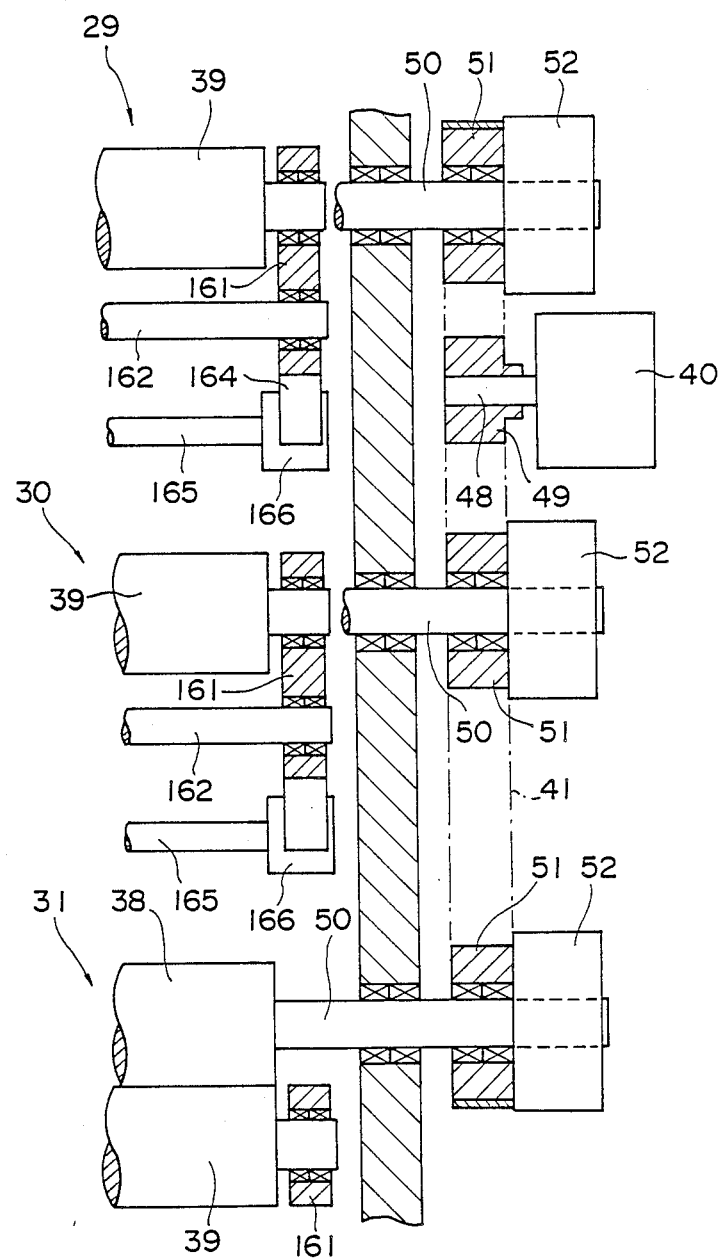
FIG. 18 is view showing the structure of a plural number of feed rollers.

FIG. 18 indicates an embodiment having a solenoid clutch 52 and a advance and retreat mechanism 160 provided for each of the feed rollers 29 through 31 when there is a plural number of feed rollers 29 through 31. The structure of each of the advance and retreat mechanisms 160 is the same as that indicated in FIG. 16A and FIG. 16B.

When film 21 is mounted and is being conveyed and recording is being performed, each of the advance and retreat mechanisms 160 and each of the solenoid clutches 52 are controlled in the same manner as has been previously described and the same effect is produced. In addition, when there is a plural number of feed rollers, solenoid clutches 52 are provided for each of the feed rollers 29 through 31 and the first feed roller 29 closest to the film cassette 22 is provided with a advance and retreat mechanism 160.

When film 21 is mounted, each of the feed rollers 29 through 31 have the transmission of the drive force interrupted by a solenoid clutch 52 and at the same time, the advance and retreat mechanism 160 of the first feed roller 29 retreats the nip roller 39 to separate it from the outer circumferential surface of the drive roller 38, the film 21 is inserted between the retreated nip roller 39 and the film 21 is inserted into between the nip rollers 39 and the drive rollers 38 of the second and third feed rollers 30 and 31. In addition when the film 21 is misfed in the conveyor path 25, the solenoid clutches 52 of all of the feed rollers 29 through 31 interrupt the transmission of the drive force and the advance and retreat mechanism 160 of the first feed roller 29 retreats the nip roller 39 to separate it from the outer circumferential surface of the drive roller 38 so that the film misfeed handling is facilitated. In addition, when recording is being performed, that solenoid clutches 52 of all of the feed rollers interrupt the transmission of the drive force so that vibration of the film 21 caused by the rotation of the feed motor 40 is prevented and the quality of the image improved. Moreover, when recording is performed to the film 21, the interruption of the transmission of the drive force by the solenoid clutches 52 and the advance and retreat mechanism 160 retreating to nip roller 39 to separate it from the outer circumferential surface of the drive roller 38 for the first feed roller 29 reduces the nip pressure that acts through the nip roller 39 to the film 21 so that variations in the load acting upon the film 21 are reduced to bring about a consequent improvement in the image quality.

In the embodiments described above, plural number of rollers among the feed rollers 29, 30, 31 and discharge roller 35 are held inactive while an image is recorded on the film 21. Alternatively, at least one of the feed rollers 29 through 31 and discharge roller 35 may be held inactive while an image is recorded on the film 21. No vibration of the film 21 arising from at least on of the feed rollers 29 through 31 and the discharge roller 35 occurs.

For the feed rollers 29 through 31 indicated in FIG. 2, the first feed roller 29 which is closest to the film cassette 22 is provided with an advance and retreat mechanism and solenoid clutches 52 are provided for each of the other feed rollers 30 and 31.

Figure 19A:
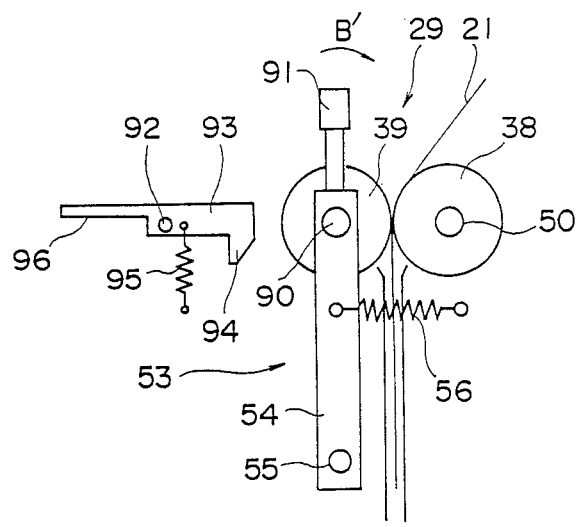
FIG. 19A and FIG. 19B are views showing the structure of an advance and retreat mechanism provided to the first feed roller.
Figure 19B:
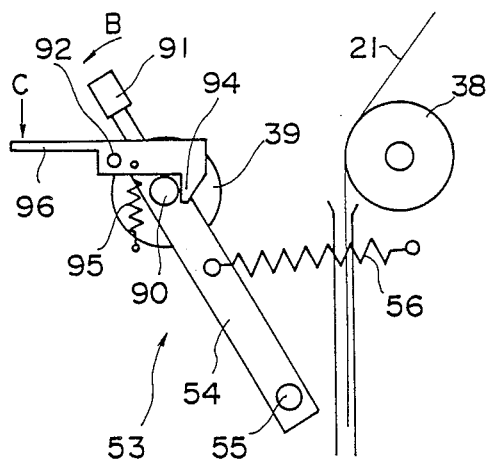

FIG. 19A and FIG. 19B indicate the structure of the advance and retreat mechanism provided for the first feed roller 29. In this embodiment, the advancing of the nip roller 39 to bring it into contact with the drive roller 38, and the retreating of the nip roller 39 to separate it from the drive roller 38 are both performed manually. This advance and retreat mechanism can also be applied to the other embodiments described previously.

The lever 54 that pivots around a support shaft 55, is supported so that a nip roller 39 can freely rotate and has mounted a handle 91 in order to operate the rotation of this lever 54, and a lock pin 90 to lock the lever 54 at a rotational position where the nip roller 39 is retreated and separated from the drive roller 38. Moreover, a lock lever 93 is also provided whereby it is freely rotatable about a support shaft 92 so as to arbitrarily engage and disengage the lock pin 90.

In this configuration, when the nip roller 39 is retreated so as to separate from the drive roller 38, the operator holds the handle 91 and moves it in the direction (the direction indicated by the arrow B in the figure) whereby the lever 54 pivots so as to separate it from the drive roller 38, and then engages the hook portion 94 of the lock lever 93 as indicated in FIG. 16B so as to engage the lock pin 90. A spring 95 urges the lock lever 93 in the direction whereby it engages with the lock pin 90 and the state of engagement with the lock lever 93 is held, and the status where the nip roller 39 is separated from the drive roller 38 is held.

When the status whereby the lock pin 90 and the lock lever 93 are engaged is cancelled and the nip roller 39 is brought into contact with the outer circumferential surface of the drive roller 38, the cancellation protrusion 96 of the lock lever 93 in the status indicated in FIG. 19B is pressed down (the direction C in the figure) and the lock lever 93 rotated about the axis of the supporting shaft 92 so that the status of engagement between the hook portion 94 of the lock lever 93 and the lock pin 90 is cancelled. When this occurs, the urging force of the spring 56 causes the lever 54 to rotate in the direction indicated by the arrow B' in the figure and the nip roller 39 is brought into contact with the outer circumferential surface of the drive roller 38.

Figure 20:
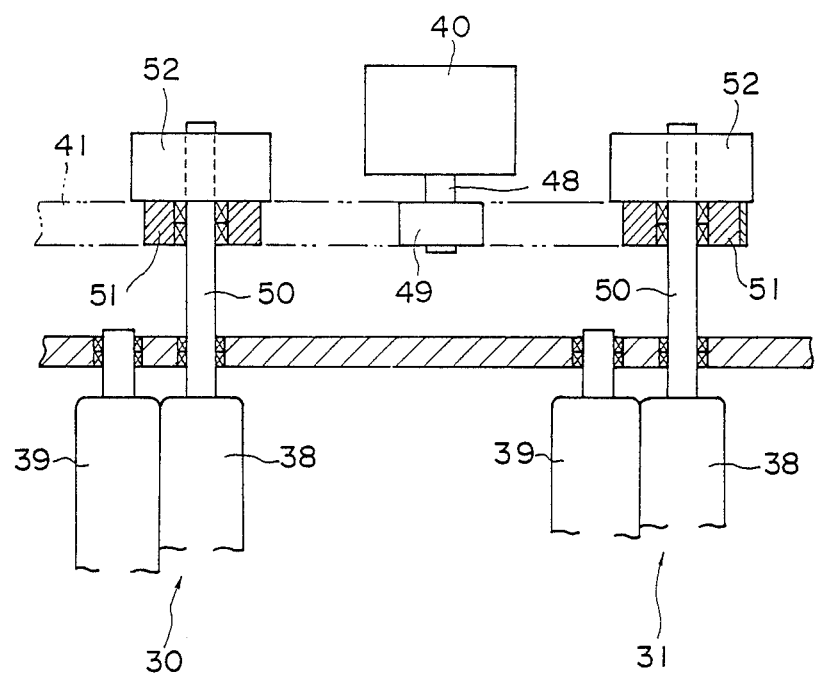
FIG. 20 is a view showing the structure of the second and third feed rollers.

FIG. 20 indicates the structure of the second and third feed rollers 30 and 31. These second and third feed rollers 30 and 31 are provided with pulleys 51 and solenoid clutch 52 on rotating shafts 50 as have already been described.

In this embodiment, when film 21 is mounted, the solenoid clutches 52 of the second and third feed rollers 30 and 31 are OFF and the operation of the advance and retreat mechanism 53 of the first feed roller 29 is performed manually. With this operation, the nip roller 39 is retreated to separate from the drive roller 38 and the film 21 is inserted into the gap created. Then, the operation described above is performed to advance the nip roller 39 to bring it into contact with the drive roller 38.

When the film 21 is being conveyed and recording is being performed, the solenoid clutches 52 of the second and third feed rollers 30 and 31 are controlled in the same manner as has been previously described.

Figure 21:
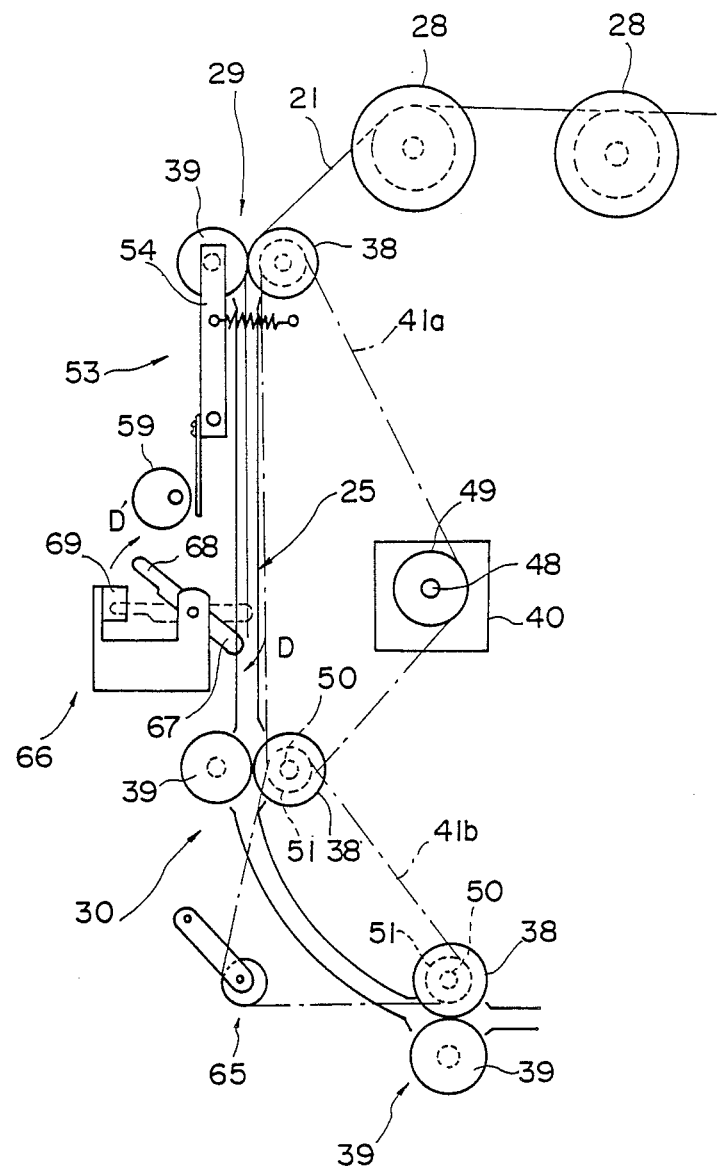
FIG. 21 is a view showing another structure of the advance and retreat mechanism provided to the first feed roller.

FIG. 21 indicates another embodiment where an advance and retreat mechanism 53 is provided to the first feed roller 29.

A detector 66 is provided to detect when the leading edge of the film 21 has been inserted between the first feed roller 29 and the second feed roller 30, and the drive force of the drive roller 38 due to the feed motor 40 is transmitted via a first belt 41a and a second belt 41b.

First, the detector 66 comprises a lever 67 that has its leading edge extending above the conveyor path 25, a mechanical shutter 68 that rotates along with the rotational operation of the lever 67, and a transparent photo-interrupter 69. When the leading edge of the film 21 proceeds along the conveyor path 25 from the first feed roller 29 in the direction of the second feed roller 30, it comes into contact with the lever 67 midway, and rotates the lever 67 in the direction indicated by the arrow D. When this occurs, the mechanical shutter 68 rotates in the direction indicated by the arrow D' to accompany the rotation of the lever 67 and the light emitted by the transparent photo-interrupter 69 is received by a receiving portion to detect the film 21. Accordingly, the results of detection by the detector 66 are used as the basis so that a mechanism driven by a motor rotating an eccentric cam 59 that automatically brings a nip roller 39 into contact with the outer circumferential surface of a drive roller 38 once the film has been inserted between the nip roller 39 and the drive roller 38 of the first feed roller 29, and the film 21 is securely held by the first feed roller 29.

Moreover, when the film 21 is used as a continuous recording medium, the wavelength region of the light is mainly from 660 to 840 nm and the wavelength region of the light emitted from the infra-red LED internal to the photo-interrupter is from 800 to 1100 nm and the detector 66 uses the transparent photo-interrupter 69 and the mechanical shutter 68, the film 21 is not exposed so that the light from the photo-interrupter is not directly irradiated upon the film 21. Accordingly, when a continuous recording medium can be used with no fear of the film 21 being exposed by the light emitted from the infra-red LED internal to the photo-interrupter, mounting is therefore simplified and a reflective type of non-contact photo-interrupter can alternatively be used for continuous recording media.

In addition, the rotational drive force of the drive roller 38 is performed using a first belt 41a and a second belt 41b having a tension roller 65 and so the solenoid clutch 52 need only be provided on the rotating shaft 50 for the second feed roller 30.

Figure 22:
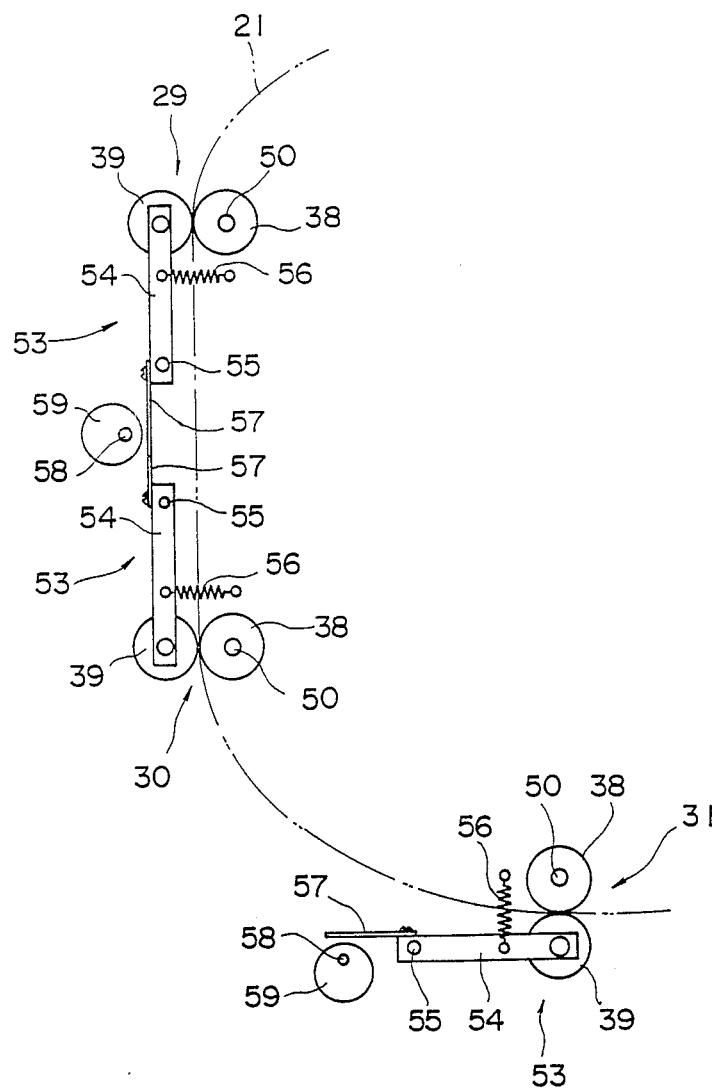
FIG. 22 is a view showing three feed rollers provided with advance and retreat mechanisms.

FIG. 22 indicates an embodiment in which an advance and retreat mechanism 53 is provided to retreat and separate the nip roller 39 from the outer circumferential surface of the drive roller 38 for each of the feed rollers 29 through 31, and in which the solenoid clutch 52 above the rotating shaft 50 of the drive roller 38 has been omitted. Moreover, the advance and retreat mechanism 53 of the first feed roller 29 and the advance and retreat mechanism 53 of the second feed roller 30 both share an eccentric cam 59.

Figure 23:
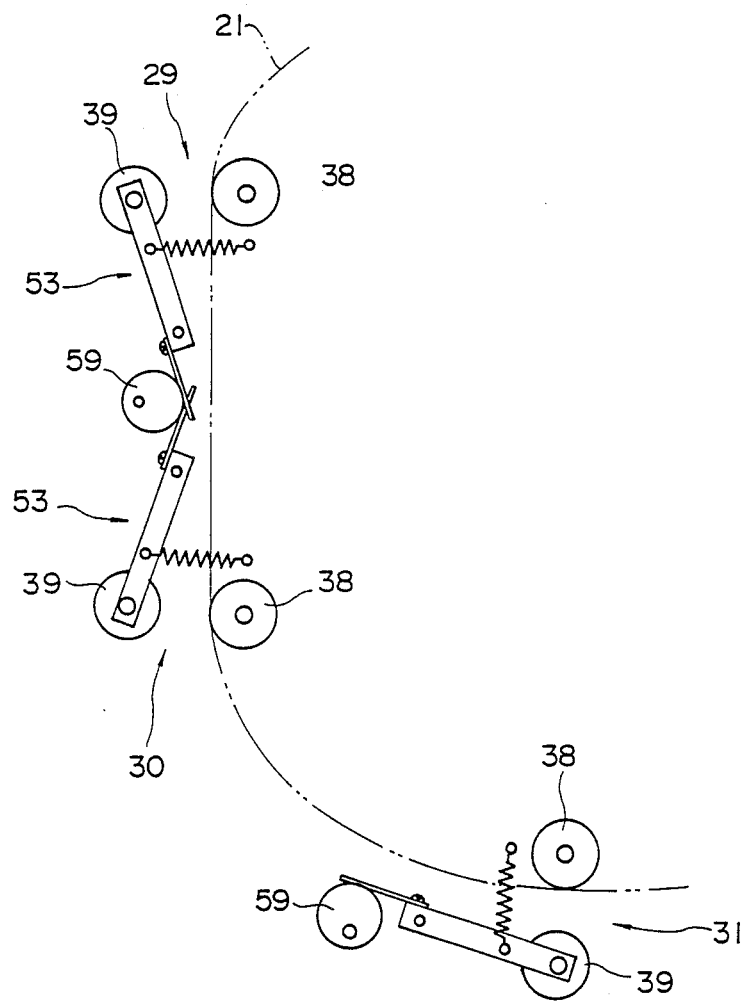
FIG. 23 is a view showing the operation of advance and retreat mechanism provided to feed rollers.

In this configuration, when the film is mounted, the rotation of the eccentric cam 59 retreats and separates all of the nip rollers 39 from the drive rollers 38 for all of the feed rollers 29 through 31, as is shown in FIG. 23. Accordingly, the leading edge of the film 21 is smoothly inserted to the position of the third feed roller 31 without coming into contact with either the drive roller 38 or the nip roller 39.

When there is a misfeed of the film 21, the nip rollers 39 of all of the feed rollers 29 through 31 are separated from the outer circumferential surface of the drive rollers 38 in the same manner as for when the film 21 is mounted. The misfed film 21 can therefore be easily removed.

Moreover, if a detector 66 is provided between the first feed roller 29 and the second feed roller 30 as shown in FIG. 21, then when the film 21 is mounted, it is not necessary to retreat the nip rollers 39 for each of the feed rollers 29 through 31 from the drive roller 38 as it is sufficient to retreat only the nip roller 39 of the first feed rollers 29 from the drive roller 38.

If the film 21 is misfed in the conveyor path 25, then the nip rollers 39 for each of the feed rollers 29 through 31 are retracted from the drive roller 38.

In addition, in the case where a advance and retreat mechanism 53 is provided for each of the feed rollers 28 through 31, the nip rollers 39 for each of the feed rollers 29 through 31 are retracted and separated from the drive roller 38 and the film 21 made to slide across the top of the outer circumferential surface of the drive roller 38 not only for when the film 21 is mounted or when there is a film misfeed, but also during recording. Therefore, it is only necessary to have the nip roller 39 in contact with outer circumferential surface of the drive roller 38 when there is film feed.

Figure 24:
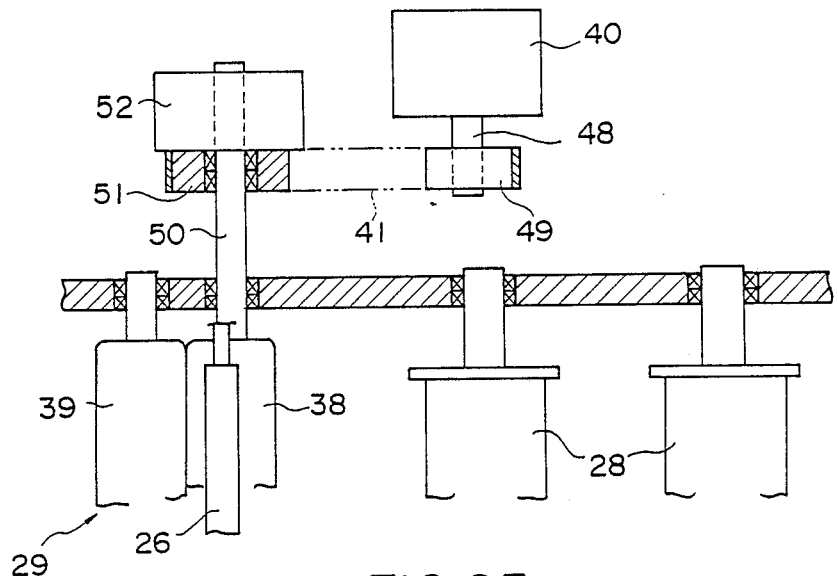
FIG. 24 and FIG. 25 are views showing configurations where the film is correctly introduced to the first feed roller.
Figure 25:
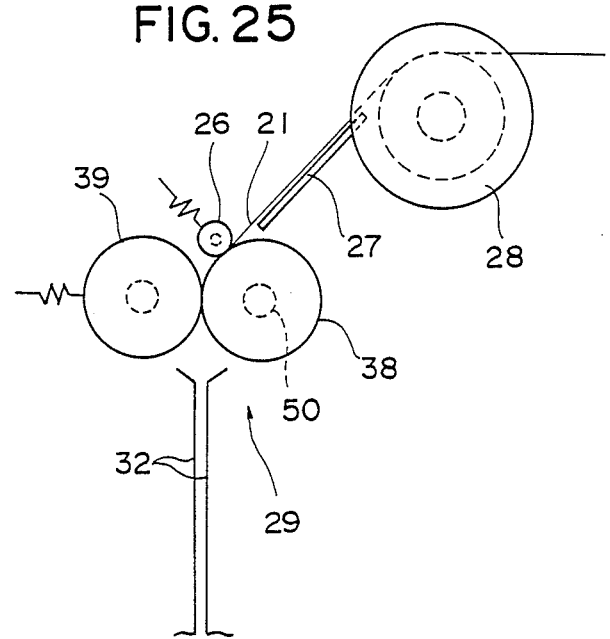

FIG. 24 and FIG. 25 indicate configurations where the film 21 has been correctly introduced into the portion of the first feed roller 29 where the nip roller 39 and the drive roller 38 are in contact.

Immediately after the flanged rollers 28 is provided first feed roller 29 which as has been described before, has a drive roller 38 and a nip roller 39, the rotating shaft 50 of the drive roller 38 being provided with a pulley 51 and a solenoid clutch 52. A belt 41 then winds between the pulley 51 and the pulley 49 of the motor shaft 48 of the feed motor 40.

Between the flanged rollers 28 and the feed roller 29 is provided a guide plate 27 to guide the film 21 in the direction of the feed roller 29. In addition, the drive roller 38 of the feed roller 29 is provided with a small-diameter nip roller 26 on the side into which the film 21 is fed. This small-diameter nip roller 26 is pressed against the drive roller 38 so hold the film 21 between itself and the drive roller 38.

When the film is mounted, the film 21 drawn out from the film cassette 22 is brought into contact with the top portion of the outer circumferential surface of the flanged rollers 28 and follows the guide plate 27 and is pulled in the direction of the feed roller 29 and its leading edge is brought into contact with the portion where the drive roller 38 and the small-diameter nip roller 26 come into contact with each other. The film 21 is then drawn along the flanged rollers 28 in order to prevent skewing. In addition, the leading edge of the film 21 is guide by the guide plate 27 and proceeds in a straight line and proceeds in this manner until it strikes the portion where the drive roller 38 and the small-diameter nip roller 26 come into contact with each other. Accordingly, it is not necessary to insert the film 21 so that the leading edge of the film 21 is guided to the portion where the drive roller 38 and the small-diameter nip roller 26 come into contact with each other. Moreover, the film 21 does not curl under itself and the leading edge of the film 21 can be easily inserted into the portion where the drive roller 38 and the small-diameter nip roller 26 come into contact with each other.

After the leading edge of the film 21 has come into contact with the portion where the drive roller 38 and the small-diameter nip roller 26 come into contact with each other, the nip roller 39 is manually rotated in the direction of conveyance of the film 21. When this is done, the solenoid clutch 52 is turned OFF so that the drive roller 38 can rotate freely and so that the nip roller 39 and the drive roller 38 rotate easily as one. Moreover, the small-diameter nip roller 26 rotates to accompany the rotation of the drive roller 38 and the leading edge of the film 21 is held by the drive roller 38 and the nip roller 39 and conveyed.

Here, if there is only a short length from the feed roller 29 to the main roller 33, the manual rotation of the nip roller 39 moves the leading edge of the film 21 to the position of the main roller 33. However, where there is a long length from the feed roller 29 to the main roller 33, the feed of the film 21 due to the manual rotation of the feed roller 29 brings the leading edge of the film 21 to the position where it is held by the nip roller 39 and the drive roller 38. After this, the solenoid clutch 52 turns ON and the drive force from the feed motor 40 is transmitted to rotate the drive roller 38. Then, the leading edge of the film 21 is brought to the position of the main roller 33. As in the case of FIG. 21, the mechanism shown in FIG. 26 has the detector 66, the first belt 41a and the second belt 41b. Those parts which are the same as those shown in FIG. 21 and FIG. 24 are given the same reference numbers.

Figure 26:
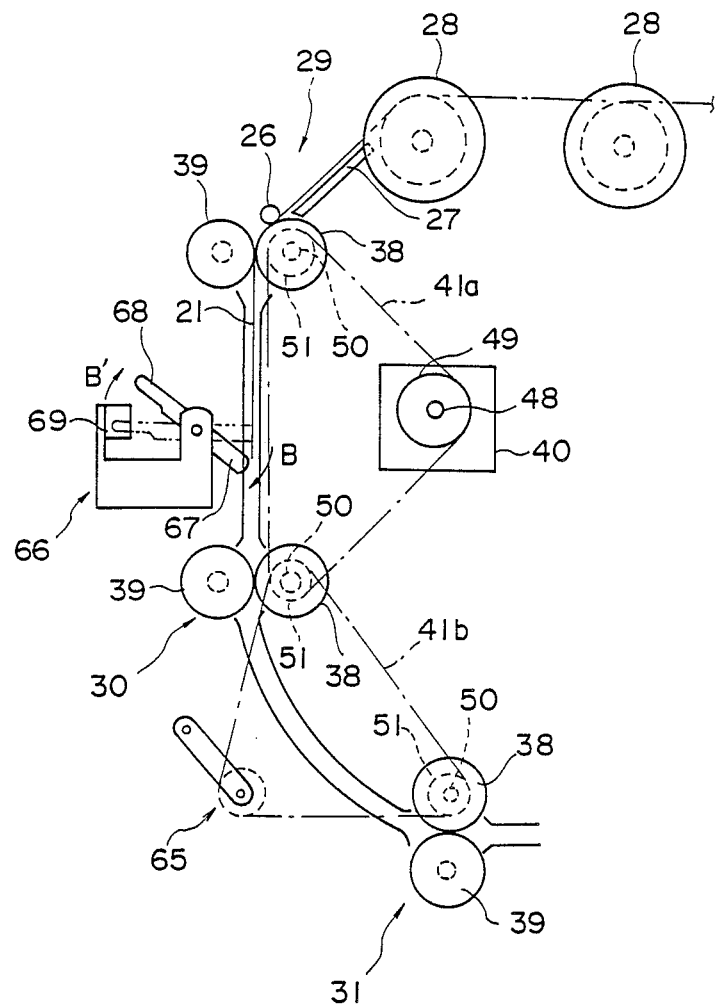
FIG. 26 is a view showing another configuration for a plural number of feed roller.

In the embodiment shown in FIG. 26 and as has been described with respect to FIG. 21, the results of detection by the detector 66 are used to turn on the solenoid clutch 52 so that a predetermined length of the film 21 can be smoothly fed by the manual rotation of the nip roller 39 and so that drive force of the feed motor 40 can then smoothly feed the film 21 to the main roller 33.

In addition, the drive force of the drive roller 38 is transmitted by the two belts 41a and 41b and so the solenoid clutch 52 need only be provided for the rotating shaft 50 of the first feed roller 29 or the rotating shaft 50 of the second feed roller 30.

Figure 27:
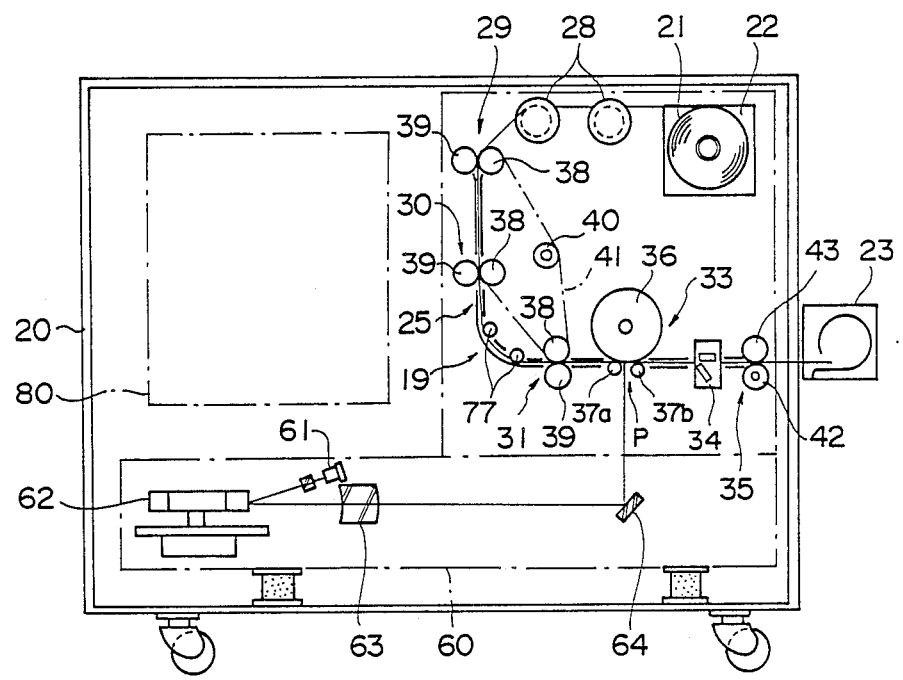
FIG. 27 is a view showing still another embodiment of the information recording apparatus to which the recording sheet conveyor means according to the present invention has been applied.

FIG. 27 indicates a recording apparatus in which the curved portion 19 of the conveyor path 25 is provided with rotating rollers 77. The other parts of the configuration are the same as the configuration shown in FIG. 2.

Figure 28:
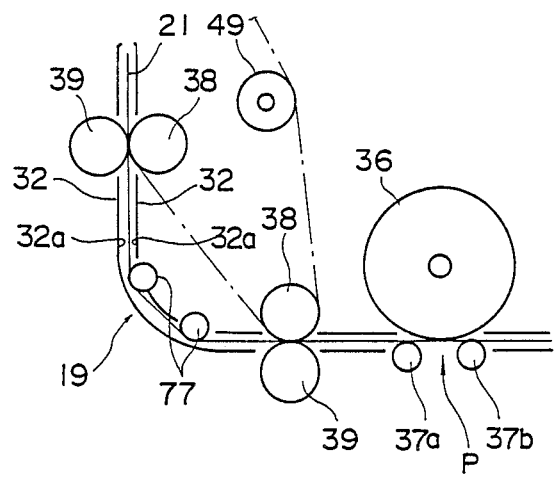
FIG. 28 is a view showing the configuration of the conveyor path.
Figure 29:
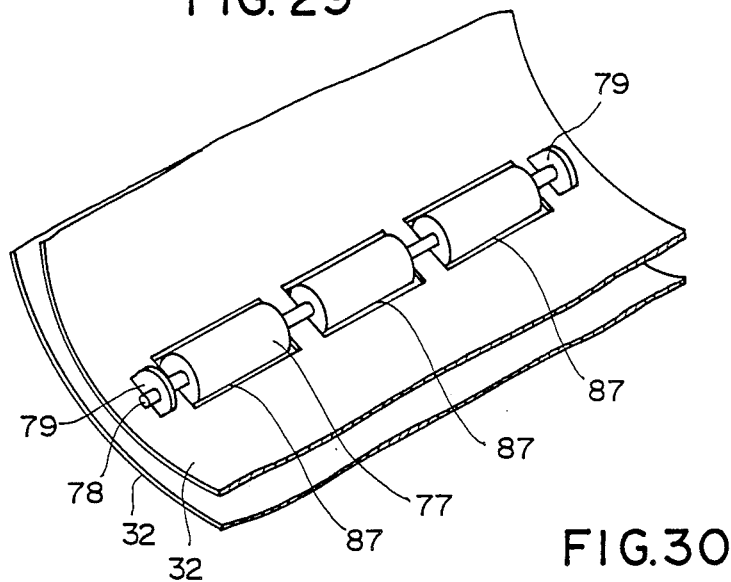
FIG. 29 is a view showing the configuration of a rotating roller.

FIG. 28 is an enlarged view of the curved portion 19 of the conveyor path 25, and FIG. 29 is a perspective view indicating the shape of the rotating rollers 77.

One of the guide plate 32 positioned on the inside of the curved portion 19 is formed at the portions at the beginning and end of the curve, with a plural number of long holes 87 in the direction across the direction of transport of the film 21. The rotating rollers 77 are formed so as to have smooth outer circumferential surfaces and so that one portion of their outer circumferential surfaces protrudes from the long holes 87 in the guide plate 32 so as to face the other guide plate. The rotating shafts 78 of these rotating rollers 77 are supported by a bearing portion 79 fixed in the inner guide plate 32 and so as to be freely rotatable.

In this configuration, the film 21 that has been drawn out from the film cassette 22 is conveyed along the conveyor path 25 and is irradiated by the laser beam and recording of image information performed at the recording position. The film 21 to which image recording has been performed is cut to a predetermined length by the cutter 34 and then discharged to the film eject cassette 23.

The film that is conveyed along the conveyor path 25 and which has its direction of conveyance changed at the curved portion 19, is conveyed while being in contact with the outer circumferential surface of the rotating rollers 77 positioned at the beginning of the curved portion 19 and the outer circumferential surface of the rotating rollers positioned at the end of the curved portion 19. Accordingly, the film is prevented from coming into contact with the guide surface 32a of the guide plate 32 on the inside of the curved portion 19. Moreover, the outer circumferential surface of the rotating rollers 77 is smooth and the rotation of the rotating rollers 77 accompanying the conveyance of the film 21 prevents the film 21 from being marked or scratched in the curved portion 19 and also prevents the occurrence of static electricity due to such contact.

Figure 30:
FIG. 30 is a view showing another rotating roller.

Moreover, it has been described that in this embodiment, the portions in contact with the film 21 are the rotating rollers 77, the number of which is determined by the number of long holes 87 but as shown in FIG. 30, a single rotating roller which is not skewered can alternatively be used.

Furthermore, it was described for this embodiment of the present invention, that the bearing portion 79 that supports the rotating shaft 78 of the rotating rollers 77 is fixed in the guide plate 32 on the inner side but the bearing portion can alternatively be provided on the main unit 20.

Figure 31:
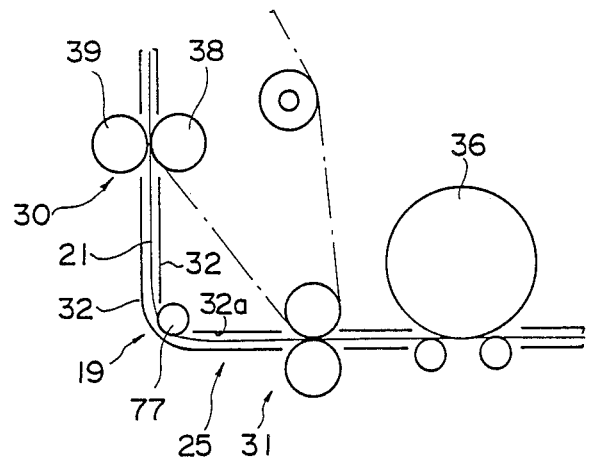
FIG. 31, FIG. 32A and FIG. 32B are views showing another configuration of a conveyor path.

FIG. 31 indicates the mechanism of a rotating rollers 77 provided at the middle portion of the curved portion 19. The film that is conveyed along the conveyor path 25 and which has its direction of conveyance changed at the curved portion 19, is conveyed while being in contact with the outer circumferential surface of the rotating rollers 77. Accordingly, the film is prevented from coming into contact with the guide surface 32a of the guide plate 32 on the inside of the curved portion 19.

Figure 32A:
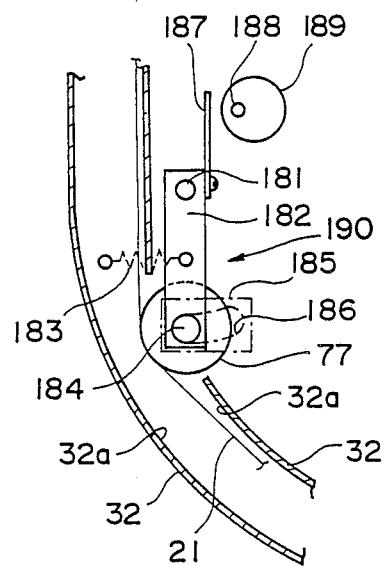
Figure 32B:
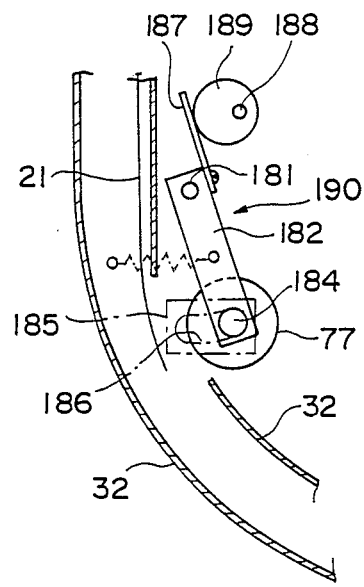

FIG. 32A and FIG. 32B show the mechanism for making the rotating rollers 77 advance and retreat into and from the conveyor path 25. The rear surface of the guide plate 32 on the inner side is provided with a rotating lever 182 which rotates freely around the axis of the supporting shaft 181. One end of this rotating lever 182 is provided with a rotating roller 77 in a long hole 87 formed in the guide plate 32 on the inner side, this rotating roller 77 being supported so as to be freely rotatable. In addition, one end of a spring 183 is engaged with rotating lever 182 so as to urge the rotating roller 77 in the direction whereby it protrudes from the long hole 87 of the guide plate 32 on the outside. Moreover, the protruding portion 184 fixed to the rotating lever 182 is engaged with the finger-shaped long hole 186 formed in the bearing portion 185 so as to regulate the range of rotation of the rotating lever 182. The other end of the rotating lever 182 is held in the supporting shaft 181 and has fixed to it a plate 187 extending in the direction opposite the rotating rollers 77. The side at the leading end of the plate 187 is provided with an eccentric cam 189 fixed to the motor shaft 188 of a motor (not indicated in the figure). The rotating lever 182 and the spring 183, and the plate 187 and the eccentric cam 189 and the like configure a mechanism 190 to make the rotating rollers 77 come out of and go back into the guide surface 32a of the guide plate 32.

In this configuration, when the film 21 is in the already mounted status, the eccentric cam 189 shown in FIG. 32A is separated from the plate 187 and the rotating lever 182 rotates due to the urging force of the spring 183 and one portion of the outer circumferential surface of the rotating rollers 77 protrudes from the long hole 87 and in the direction of the outer guide plate 32.

Next, when the film 21 is mounted, the drive force of the motor rotates the eccentric cam 189 so that the large-diameter portion of the eccentric cam 189 comes into contact with the plate 187 as shown in FIG. 32B. When this occurs, the rotating lever 182 rotates around the axis of the supporting shaft 181 and the rotating roller 77 retreats into the long hole 87 and back towards the inner side. Because of this, even when the film 21 is being fed along the conveyor path 25 because the film 21 has been set, the leading edge of the film 21 is prevented from coming into contact with the rotating roller 77.

After the mounting of the film 21 has been completed, the eccentric cam 189 is rotated once again so that one part of the rotating rollers 77 protrudes from the long hole 87 and moves in the direction of the outer guide plate 32 as shown in FIG. 32A.

What is claimed is:

1. A recording sheet conveyor apparatus in an image recording apparatus having recording sheet housing means for housing a recording sheet, information recording means for recording image information on the moving recording sheet that is drawn out of said recording sheet housing means, and sheet receiving means for receiving the sheet after image information is recorded to it comprising:
    a conveyor path provided between said recording sheet housing means and said sheet receiving means;
    a main roller, rotated by a predetermined drive source and positioned along said conveyor path and in a vicinity of a position for recording by said information recording means, for feeding said recording sheet at a predetermined speed;
    a feed roller, rotated by a predetermine drive source and provided along said conveyor path between said recording sheet housing means and said main roller, for feeding said recording sheet a toward said main roller;
    a discharge roller, rotated by a predetermined drive source and provided along said conveyor path between said main roller and said sheet receiving means, for feeding said recording sheet to said sheet receiving means after recording is performed for it; and
    roller drive prohibit means for prohibiting at least one of said feed roller and said discharge roller in the range of said recording sheet fed by said main roller, from being driven while said information recording means is performing recording.

2. The recording sheet conveyor apparatus as claimed in claim 1, wherein said feed roller is prohibited from being driven by said roller drive prohibit means.

3. The recording sheet conveyor apparatus as claimed in claim 1, wherein said discharge roller is prohibited from being driven by said roller drive prohibit means.

4. The recording sheet conveyor apparatus as claimed in claim 1, wherein said feed roller and said discharge roller are prohibited from being driven by said roller drive prohibit means.

5. The recording sheet conveyor apparatus as claimed in claim 1, wherein:
    said main roller has a main drive roller rotationally driven by said drive source, and a pair of nip rollers positioned immediately before and after said main drive roller in the direction of feed of the recording sheet, for holding the recording sheet along with said main drive roller, said pair of nip rollers rotating along with the rotation of said main drive roller,
    said feed roller has a drive roller rotationally driven by said drive source, and a nip roller holding said recording sheet along with said drive roller and rotating along with the rotation of said drive roller,
    and said discharge roller has a drive roller rotationally driven by said drive source, and a nip roller holding said recording sheet along with said drive roller and rotating along with the rotation of said drive roller.

6. The recording sheet conveyor apparatus as claimed in claim 5, wherein said drive source to rotate said main drive roller includes a servo-motor having a planetary roller reduction mechanism.

7. The recording sheet conveyor apparatus as claimed in claim 5, wherein:
    said roller to which drive is prohibited by said roller drive prohibit means is provided with clutch means for performing the connection and interruption of the rotational drive force between said drive roller and said drive source, and said roller drive prohibit means prohibits from interrupting the drive force from said drive source to said drive roller by said clutch means.

8. The recording sheet conveyor apparatus as claimed in claim 5, wherein said roller to which drive is prohibited by said roller drive prohibit means is provided with contacting and separating means for advancing and retreating the nip roller with respect to the drive roller, and said roller drive prohibit means prohibits the roller drive of the said roller by separating the nip roller from said roller by the contacting and separating means.

9. The recording sheet conveyor apparatus as claimed in claim 5, wherein said roller to which drive is prohibited by said roller drive prohibit means is provided with clutch means for performing the connection and interruption of the rotational drive force between said drive roller and its drive source, and is provided with contacting and separating means for advancing and retreating the nip roller with respect to the drive roller, and said roller drive prohibit means prohibits roller drive by interrupting the drive force from a drive source to said drive roller by said clutch means and by separating the nip roller from the drive roller by said contacting and separating means.

10. A recording sheet conveyor apparatus in an image recording apparatus having recording sheet housing means for housing a recording sheet, information recording means for recording image information on the moving recording sheet that is drawn out of said recording sheet housing means, and sheet receiving means for receiving the sheet after image information is recorded to it comprising:
    a conveyor path provided between said recording sheet housing means and said sheet receiving means;
    a main roller, rotated by a predetermined drive source and positioned along said conveyor path and in a vicinity of a position for recording by said information recording means, for feeding said recording sheet at a predetermined speed;
    a feed roller, rotated by a predetermined drive source and provided along said conveyor path between said recording sheet housing means and said main roller, for feeding said recording sheet toward said main roller;

a discharge roller, rotated by a predetermined drive source and provided along said conveyor path between said main roller and said sheet receiving means, for feeding the recording sheet to said sheet receiving means after recording is performed for it; and clutch means for coupling said drive source and at least one of said feed roller and said discharge roller and for separating said drive source from at least one of said feed roller and said discharge roller.

11. The recording sheet conveyor apparatus as claimed in claim 10, wherein said clutch means is provided with said feed roller.

12. The recording sheet conveyor apparatus as claimed in claim 10, wherein said clutch means is provided with said feed roller and said discharge roller.

13. The recording sheet conveyor apparatus as claimed in claim 10, wherein said roller to which said clutch means is provided, has a drive roller rotationally driven by the drive source, and a nip roller holding the recording sheet together with said drive roller and rotating along with the rotation of said drive roller, and wherein said clutch means performs the connection and interruption of the rotational drive force transmission from said drive source to said drive roller.

14. The recording sheet conveyor apparatus as claimed claim 11, further comprising a guide plate which is positioned immediately before said feed roller in said conveyor path and guides with respect to said feed roller said recording sheet drawn from said recording sheet housing means, and a small-diameter nip roller provided on the side on which said recording sheet is fed into said feed roller, said small-diameter-nip roller holding the recording sheet along with said feed roller and rotating along with the rotation of said feed roller.

15. The recording sheet conveyor apparatus as claimed in claim 13, wherein a roller to which said clutch means is provided is additionally provided with contacting and separating means for advancing and retreating said nip roller with respect to the drive roller.

16. The recording sheet conveyor apparatus as claimed in claim 13, wherein a plural number of said feed rollers are provided, all of said feed rollers are provided with said clutch means for performing the connection and interruption of the rotational drive force between said drive roller and said drive source, and contacting and separating means for advancing and retreating said nip roller with respect to said drive roller.

17. The recording sheet conveyor apparatus as claimed in claim 13, wherein a plural number of said feed rollers are provided, all of said feed rollers are provided with said clutch means for performing the connection and interruption of the rotational drive force between said drive roller and said drive source, and wherein the feed roller nearest said recording sheet housing means is provided with contacting and separating means for advancing and retreating said nip roller with respect to said drive roller.

18. A recording sheet conveyor apparatus in an image recording apparatus having recording sheet housing means for housing a recording sheet, information recording means for recording image information on the moving recording sheet that is drawn out of said recording sheet housing means, and sheet receiving means for receiving said sheet after image information has been recorded to it comprising:

a conveyor path provided between said recording sheet housing means and said sheet receiving means;

a main roller, rotated by a predetermine drive source and positioned along said conveyor path and in a vicinity of position for recording by said information recording means, for feeding said recording sheet at a predetermined speed;

a plural number of feed rollers provided along said conveyor path between said recording sheet housing means and said main roller, each of said feed rollers having a drive roller rotationally driven by the drive source, and a nip roller holding the recording sheet together with the drive roller and rotating along with the rotation of said drive roller to transport the recording sheet toward said main roller;

a discharge roller, rotated by a predetermined drive source and provided along said conveyor path between said main roller and said sheet receiving means, said discharge roller feeding the recording sheet to said sheet receiving means after recording has been performed for it;

contacting and separating means, provided for the feed roller closest to said recording sheet housing means, for contacting and separating said nip roller with and from a drive roller; and clutch means, provided for other feed rollers, for contacting and interrupting said drive source with and from said other feed rollers.

19. A recording sheet conveyor apparatus in an image recording apparatus having recording sheet housing means for housing a recording sheet that is the recording media, information recording means for recording image information on the moving recording sheet that is drawn out of said recording sheet housing means, and sheet receiving means for receiving said sheet after image information has been recorded to it comprising:

a conveyor path provided between said recording sheet housing means and said sheet receiving means;

a main roller, rotated by a predetermined drive source and positioned along said conveyor path and in a vicinity of a position for recording by said information recording means, for feeding said recording sheet at a predetermined speed;

a plural number of feed rollers provided along said conveyor path between said recording sheet housing means and said main roller, each of said feed rollers having a drive roller rotationally driven by the drive source, and a nip roller holding a recording sheet together with the drive roller and rotating along with the rotation of said drive roller, to feed said recording sheet toward said main roller;

a discharge roller, rotated by a predetermined drive source, and provided along said conveyor path between said main roller and said sheet receiving means, for feeding said recording sheet to said sheet receiving means after recording has been performed for it;

contacting and separating means provided for all feed rollers for contacting and separating a nip roller with and from said drive roller.

20. A recording sheet conveyor apparatus in an image recording apparatus having recording sheet housing means for housing a recording sheet, information recording means for recording image information on the moving recording sheet that is drawn out of said recording sheet housing means, and sheet receiving means for receiving said sheet after image information has been recorded to it comprising:
- a conveyor path provided between said recording sheet housing means and said sheet receiving means;
- a main roller, rotated by a predetermined drive source and positioned along said conveyor path and in a vicinity of a position for recording by said information recording means, for feeding said recording sheet at a predetermined speed;
- a feed roller, rotated by a predetermined drive source and provided along said conveyor path between said recording sheet housing means and said main roller, for feeding said recording sheet in the direction of said main roller;
- a discharge roller, rotated by a predetermined drive source and provided along said conveyor path between said main roller and said sheet receiving means, for feeding said recording sheet to said sheet receiving means after recording has been performed for it;
- a pair of first and second guide plates provided along said the conveyor path and disposed so that the recording sheet being conveyed passes between them; and
- roller means, projecting from said first guide plate in the direction of said second guide plate and for coming into contact with a recording sheet so as to be freely rotatable in the direction of movement of said recording sheet, for supporting said recording sheet.

21. The recording sheet conveyor apparatus as claimed in claim 20, wherein said conveyor path has a curved portion, said roller means is provided at least one of a portion of said conveyor path where said curved portion starts, a portion of said conveyor path wherein said curved portion ends, and a part of said curved portion.

22. The recording sheet conveyor means of claim 20, further comprising roller advance and retreat means for projecting a part of the outer circumferential surface of said roller means from said first guide plate in the direction of said second guide plate and for retreating said part of the outer circumferential surface of said roller means outside of said first and second guide plates.

* * * * *